(12) United States Patent
Ogata et al.

(10) Patent No.: US 6,641,479 B1
(45) Date of Patent: *Nov. 4, 2003

(54) CONTROL UNIT AND SYSTEM UTILIZING THE CONTROL UNIT

(75) Inventors: Hiroki Ogata, Chiba (JP); Toru Akazawa, Tokyo (JP); Akihisa Ono, Tokyo (JP)

(73) Assignee: Sony Computer Entertainment, Inc., Tokyo (JP)

( * ) Notice: Subject to any disclaimer, the term of this patent is extended or adjusted under 35 U.S.C. 154(b) by 219 days.

This patent is subject to a terminal disclaimer.

(21) Appl. No.: 09/617,735

(22) Filed: Jul. 17, 2000

Related U.S. Application Data

(63) Continuation-in-part of application No. 09/064,467, filed on Apr. 22, 1998, now Pat. No. 6,171,191.

(30) Foreign Application Priority Data

Apr. 24, 1997 (JP) .............................................. 9-107942

(51) Int. Cl.⁷ .............................. A63F 9/24; G06G 5/08
(52) U.S. Cl. ...................................................... 463/37
(58) Field of Search ............................... 463/36–38, 30, 463/46–47; 273/148 B, 148 R; 345/156–157, 161

(56) References Cited

U.S. PATENT DOCUMENTS

| | | | |
|---|---|---|---|
| 5,036,239 A | 7/1991 | Yamaguchi | 310/268 |
| 5,542,672 A | 8/1996 | Meredith | 463/37 |
| 5,669,818 A | 9/1997 | Thorner et al. | 463/30 |
| 5,691,898 A | 11/1997 | Rosenberg et al. | 364/190 |
| 5,734,373 A | 3/1998 | Rosenberg et al. | 345/161 |
| 5,853,326 A | 12/1998 | Goto et al. | 463/37 |
| 5,897,437 A | 4/1999 | Nishiumi et al. | 463/47 |
| 6,171,191 B1 * | 1/2001 | Ogata | |

FOREIGN PATENT DOCUMENTS

| | | |
|---|---|---|
| JP | 62-194389 | 12/1987 |
| JP | 62-3-21691 | 3/1991 |
| JP | 07-112074 | 5/1995 |
| JP | 07-194846 | 8/1995 |
| JP | 08-140301 | 5/1996 |
| JP | 09-000741 | 1/1997 |

OTHER PUBLICATIONS

Article entitled "Sign of Evolution in Controller; Advent of Analog Pat"–published by Kadokawa in Feb. 1997, Monthly Issue of "Game Walker," vol. 4, No. 2, P24.

* cited by examiner

*Primary Examiner*—Mark Sager
(74) *Attorney, Agent, or Firm*—Fulwider Patton Lee & Utecht, LLP

(57) ABSTRACT

The invention relates to a system including a machine capable of retrieving data from a recording medium and of executing a program retrieved from the recording medium in response to an instruction given by an operator to the machine. Particularly, the invention relates to a system which comprises of such machine and a control unit connected to the machine for controlling the machine. The control unit includes: a housing; a pair of diverging grips which are molded integral with said housing and are supportable by both palms of the operator; a plurality of finger-manipulatable controllers mounted on the housing; and a vibration motor mounted within at least one of the grips via a adapter. The vibration motor includes: a casing; a freely rotatable shaft supported by the casing; an eccentric member, mounted on the shaft, having a rotor mounted on the shaft and a plurality of coils mounted on the rotor. Accordingly, when the coils are activated by the electric current, the motor is set in vibration caused by the rotation of the eccentric member. The vibrations of the motor is transmitted to the operator via the grips, thereby providing the operator with enhance virtual reality in the game.

15 Claims, 22 Drawing Sheets

(a) 
11a (b) 
11b (c) 
11c (d) 
11d

CONTROL UNIT AND SYSTEM UTILIZING THE CONTROL UNIT

RELATED APPLICATION

This application is a continuation-in-part of application Ser. No. 09/064,467, filed on Apr. 22, 1998 now U.S. Pat. No. 6,171,191, which claims priority to Japanese application P09-107942, filed on Apr. 24, 1997.

BACKGROUND OF THE INVENTION

1. Field of the Invention

This invention relates to a control unit for controlling the movements of an animated character of a game software, for example, on a display and to a system utilizing such control unit. More particularly, it relates to a control unit and a system which enable the player to acquire enhanced virtual reality in the game.

2. Description of Related Art

A conventional game machine utilizing a TV set as a display screen incorporates a main unit connectable to the TV set with a connection cable, and a control unit connected to the main unit with a connection cable for controlling the movements of a character displayed on the display screen.

The main unit includes a disk drive for retrieving a program from a recording medium such as an optical disk and a graphic processor for displaying a character on the display along with a background picture in accordance with the program.

The control unit is provided on the surface thereof with a multiplicity of control buttons. The player of the game may operate these control buttons to enter instructions in order to control the movements of the character on the screen in the direction as he wishes.

Such a control unit as described above is usually implemented as a hand-held unit operable by fingers. The hand-held unit is provided on one side thereof with a circular or a cross shaped direction controller having a set of direction buttons for controlling the direction of the movement of the character, and on the other side thereof a function controller having a multiplicity of function buttons for setting and executing functions allowable for the character. The circular or cross shaped direction controller has four switches associated with the direction buttons, which are angularly spaced apart at right angles about their common center and may be selectively turned on and/or off by the direction button pushed by the player, so that the character is digitally moved in the corresponding direction on the screen. The function controller has a multiplicity of switches associated with the function buttons for setting up functions which the character can perform on the screen. The function controller is also used to execute the functions thus set up for the character.

In the above-described conventional control unit, although the player visually perceives the motions of the character on the display and hears sounds from the speakers of the system, he runs the game only by operating a multiplicity of control buttons on the controller with fingers. Therefore, the game is unidirectional in that the game proceeds based only on the information given by the player to the control unit, but that no feedback is given from the control unit to the player.

SUMMARY OF THE INVENTION

Briefly, and in general terms, the present invention has several objectives. One objective is to provide a control unit for a game machine capable of performing functions in response to the signals received from the game machine, so that the player may enjoy the game with enhanced virtual reality. Another object of the invention is to provide a control unit usable for a game that involves versatile motions of a character. A further object of the invention is to provide a control unit for a game machine providing the player with physically added virtual reality. Yet another object of the invention is to provide a control unit for a game machine which is compact in size and yet capable of efficiently transmitting vibrations to the player.

In one aspect of the invention, there is provided a control unit connected to a machine for retrieving and processing information stored on a recording medium. The control unit is operable by an operator to send instructions to the machine to execute a program stored on the recording medium. The control unit includes a housing, a plurality of finger-manipulatable controllers mounted on the housing, a pair of diverging grips which are molded integral with the housing and project from one side (rear side) of the housing facing the operator towards the player. The grips are supportable by both palms of the operator. The control unit also includes a vibration motor mounted within at least one of either the housing and/or grips via an adapter. The motor includes a casing, a freely rotatable shaft supported by the casing and an eccentric member mounted on the shaft. The eccentric member has a rotor mounted on the shaft and a plurality of coils mounted on the rotor and a magnet mounted on the casing and facing the eccentric member. The motor further includes means for supplying electric current to each of the coils for energizing the motor and setting the motor in vibration by the eccentric rotation of the eccentric member. The housing, grips and controllers are sized and arranged so that the operator is able to manipulate the controllers with his fingers and feel the vibration of the energized motor through at least one of the housing and grips.

In another aspect of the invention, there is provided a control unit connected to a machine for retrieving and processing information stored on a recording medium. The control unit is operable by an operator to send instructions to the machine to execute a program stored on the recording medium. The control unit includes a housing, a plurality of finger-manipulatable controllers mounted on the housing, and a vibration motor mounted within the housing via an adapter. The motor includes a casing, a freely rotatable shaft supported by the casing and an eccentric member mounted on said shaft. The eccentric member has a rotor mounted on the shaft and a plurality of coils mounted on the rotor. The motor also includes a magnet mounted on the casing and facing the eccentric member, and means for supplying electric current to each of the coils for energizing the motor and setting the motor in vibration by the eccentric rotation of the eccentric member. The vibration motor is set in a vibratory motion caused by the rotation of the eccentric member when the motor is energized by the electric current and transmits the vibrations to the operator via the housing.

In a further aspect, the invention relates to a system including a machine capable of retrieving data from a recording medium and of executing a program retrieved from the recording medium in response to an instruction given by an operator to the machine. The system includes a control unit connected to the machine for controlling the machine. The control unit has a housing, a multiplicity of finger-manipulatable controllers mounted on the housing, a pair of diverging grips which are molded integral with the housing and project from one side (rear side) of the housing facing the operator towards the player. The grips are supportable by both palms of the operator. The control unit also includes a vibration motor mounted within at least one of either the housing and/or the grips via an adapter. The vibration motor includes a casing, a freely rotatable shaft supported by the casing, and an eccentric member mounted on the shaft. The eccentric member has a rotor mounted on the shaft and a plurality of coils mounted on the rotor. The motor further includes a magnet mounted on the casing and facing the eccentric member, and means for supplying electric current to each of the coils for energizing the motor and setting the motor in vibration by the eccentric rotation of the eccentric member. The housing, grips and controllers are sized and arranged so that the operator is able to manipulate the controllers with his fingers and feel the vibration of the energized motor through at least one of the housing and grips.

In a still further aspect of the invention, there is provided a system including a machine capable of retrieving data from a recording medium and of executing a program retrieved from the recording medium in response to an instruction given by an operator to the machine. The system includes a housing, a plurality of finger-manipulatable controllers mounted on the housing, and a vibration motor mounted within said housing via an adapter. The motor includes a casing, a freely rotatable shaft supported by the casing and an eccentric member mounted on the shaft. The eccentric member has a rotor mounted on the shaft and a plurality of coils mounted on the rotor. The motor further includes and a magnet mounted on the casing and facing the eccentric member and means for supplying electric current to each of the coils for energizing the motor and setting the motor in vibration by the eccentric rotation of the eccentric member. The vibration motor is set in a vibratory motion caused by the rotation of the eccentric member when the motor is energized by the electric current and transmits the vibrations to the operator via the housing.

BRIEF DESCRIPTION OF THE DRAWINGS

Preferred embodiments of the invention will now be described in conjunction with the accompanying drawings, in which.

DETAILED DESCRIPTION OF THE PREFERRED EMBODIMENTS

It will be apparent from the foregoing that, while particular forms of the invention have been illustrated and described, various modifications can be made without departing from the spirit and scope of the invention.

A control unit 1 of the invention is connected to a main unit of the game machine which is equipped with means such as a disk drive for retrieving a game program stored on a recording medium such as an optical disk, and with a graphic processor for displaying a character of the game together with a background picture on a TV display so that the game may be controlled by a player by controlling the game machine.

Figure 1:
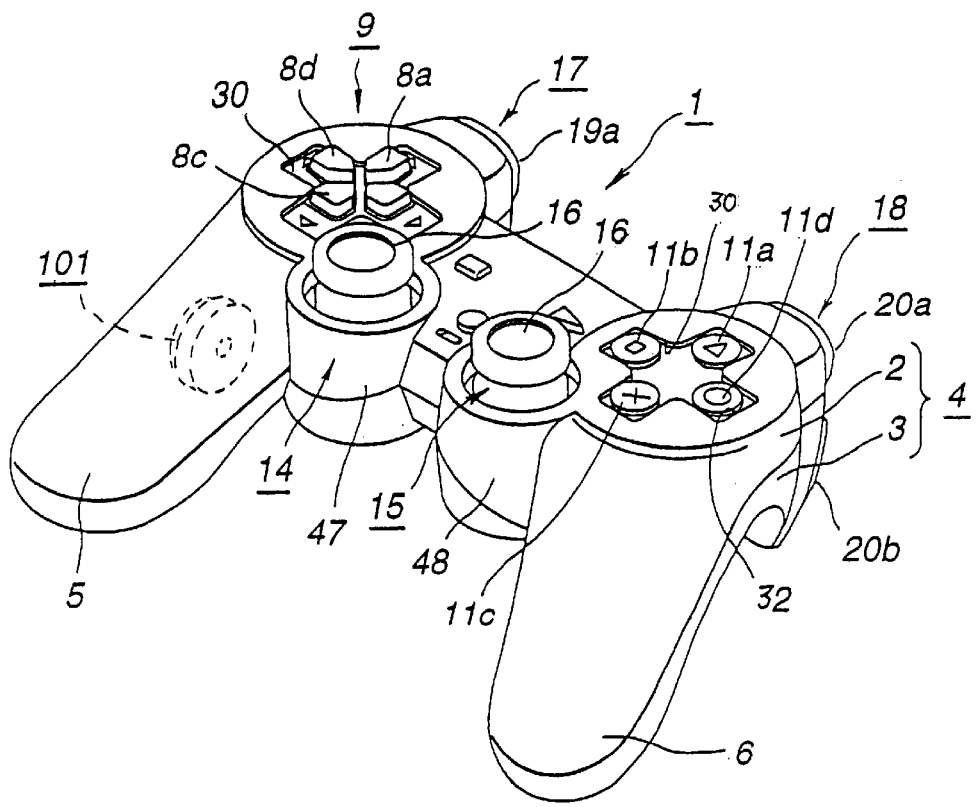
FIG. 1 is a perspective view of a control unit for use with a game machine according to the present invention.
Figure 2:
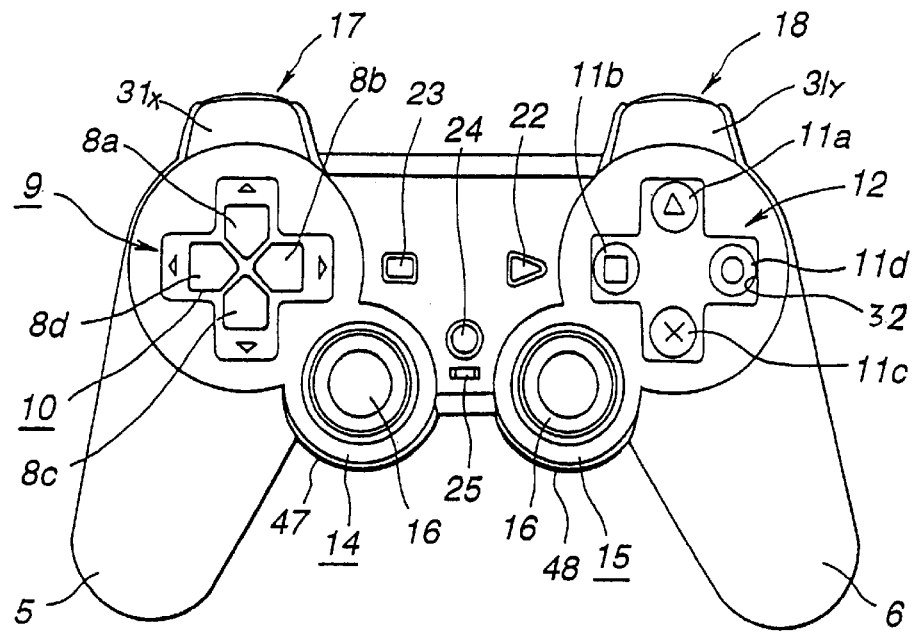
FIG. 2 is a plan view of the control unit shown in FIG. 1.
Figure 3:
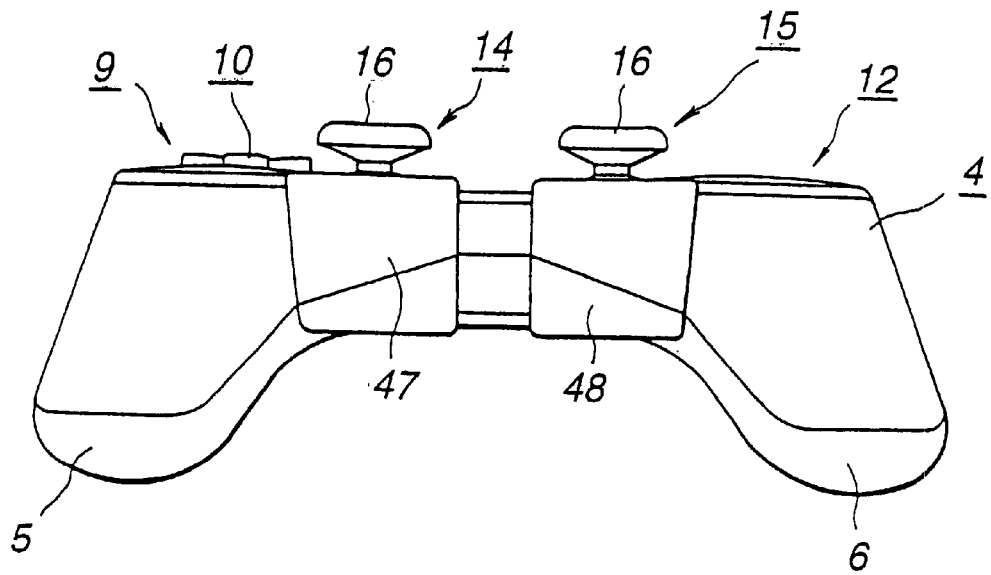
FIG. 3 is a rear view of the control unit of FIG. 1.
Figure 4:
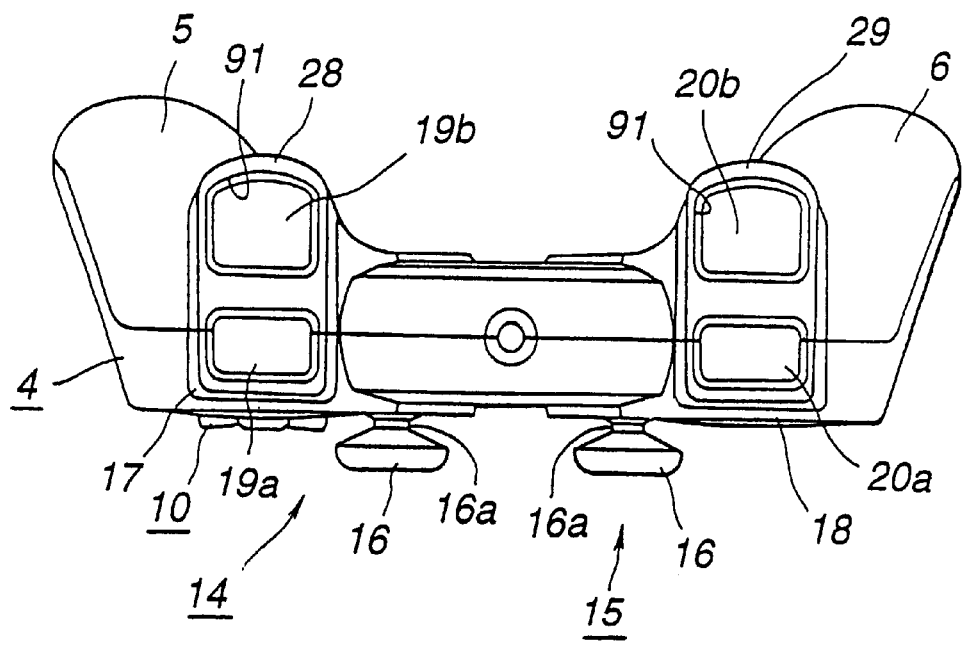
FIG. 4 is a front view of the control unit of FIG. 1.
Figure 5:
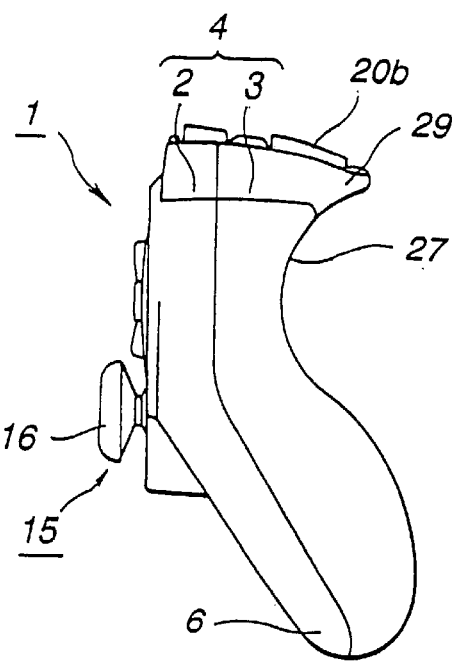
FIG. 5 is a right side view of the control unit of FIG. 1.
Figure 6:
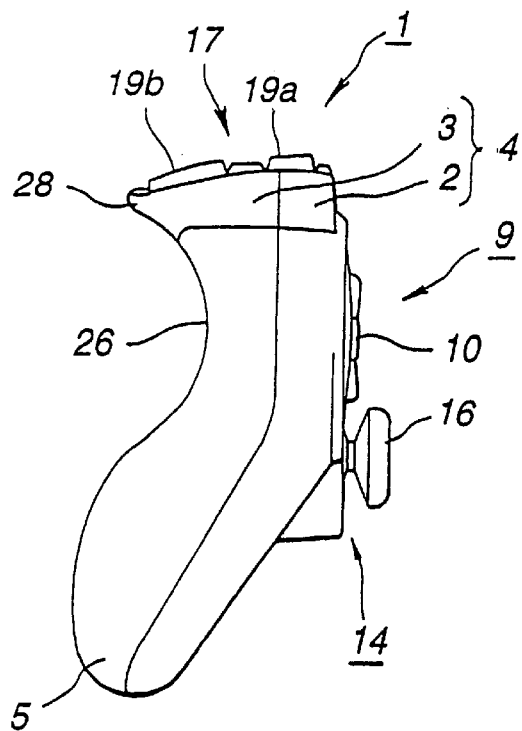
FIG. 6 is a left side view of the control unit of FIG. 1.

The control unit 1 has a housing 4 which consists of an upper half section 2 and a lower half section 3 mated together and secured by coupling means such as screws, as shown in FIG. 1. Formed on the opposite ends of the housing 4 are a first grip 5 and a second grip 6 which diverge downward from the housing as shown in FIGS. 2 through 4, so that the player playing the game may support them with both palms and operate controllers of the control unit 1 connected to the main unit of the game machine as shown in FIGS. 1 and 2. In order to alleviate fatigue of the player playing the game for a long period of time, the grips 5 and 6 are tapered towards their free ends. They have curved surfaces, and their free ends are arcuated, as shown in FIGS. 2, 5 and 6.

Mounted on the upper surface of the housing 4 is a first controller 9 having four push buttons 8a–8d which are arranged in two perpendicular directions as shown in FIGS. 1 and 2. The first through the fourth push buttons 8a–8d are formed integral with a pivotal controller member 10, which is supported at its center as described in detail below. The first controller 9 has four electric switch one for each bush button. The first controller 9 can be used, for example, to control the translational movements of the character in a desired direction. This can be done by pushing one of the four buttons 81–8d located in that direction and turning on the switch associated with the button.

A second controller 12 is provided on the other end of the housing 4, which comprises four push buttons 11a–11d arranged in two perpendicular directions as shown in FIGS. 1 and 2. These four push buttons 11a–11d are formed as independent elements and provided with respective switching elements to serve as individual signal input devices. The second controller 12 can be used, for example, to set up various functions for the character by selectively operating the four push buttons 11a–11d to turn on/off the corresponding switches. The second controller can be also used to execute the functions thus set.

It is noted that the control unit 1 of the invention has a third and a fourth mutually opposing controllers 14 and 15, respectively, on the housing 4 and near the root sections of the first and the second grips 5 and 6, respectively. The controllers 14 and 15 are each provided with a rotary controller 16 which is pivotable through 360 degrees about a pivot 16a, and a signal input device such as a variable resistor controlled by the rotary controller 16. The rotary controller 16 can be rotated to an arbitrary angular position, but is urged by a return mechanism to return to its home or neutral position when released. The rotary controllers 14 and 15 serve as means for inputting instructions for analog or continuous movements of the character. By rotating these rotary controllers 14 and 15, respectively, the character may be rotated as it moves at different speed from one position to another and/or changes its pose.

Mounted on the opposite ends of the front side (i.e. the side remote from the first and the second grips) of the housing 4, are a fifth and a sixth controllers 17 and 18, respectively. The controllers 17 and 18 are each provided with a set of a first and a second push buttons 19a–19b or 20a–20b, as shown in FIG. 4. Each of the push buttons 19a–19b and 20a–20b has a switch for setting a function for the character. These push buttons may be also used to execute the functions.

Provided on the top surface of the housing 4 and arranged in a row between the first controllers 9 and the second controller 12 are a start-up switch 22 for starting the game and a selection switch 23 for selecting the level of sophistication of the game. The control unit 1 is also provided with a mode selection switch 24 for selecting the mode of the third and the fourth controllers 14 and 15, respectively, and a mode indicator 25 for indicating the modes of the third and the fourth controllers 14 and 15. The mode selection switch 24 and the indicator 25 are located between the third and the fourth controllers 14 and 15, respectively. The indicator 25 includes a set of light emitting elements such as LEDs. Depending on the mode selected by the mode selection switch 24, the third and the fourth controllers 14 and 15, respectively, may be set in one mode to admit instruction signals, and in another mode set to prohibit admission of such instruction signals. In still another mode, the controllers 14 and 15 may be enabled to admit instructions while permitting operations of not only the second controllers 12 associated with the four push buttons 11a–11d but also the fifth and the sixth controllers 17 and 18 associated with the first and second sets of push buttons 19a–19b and 20a–20b. Appropriate one of the light emitting elements of the indicator 25 will be turned on or the color of the light is changed to indicate the mode selected.

Figure 7:
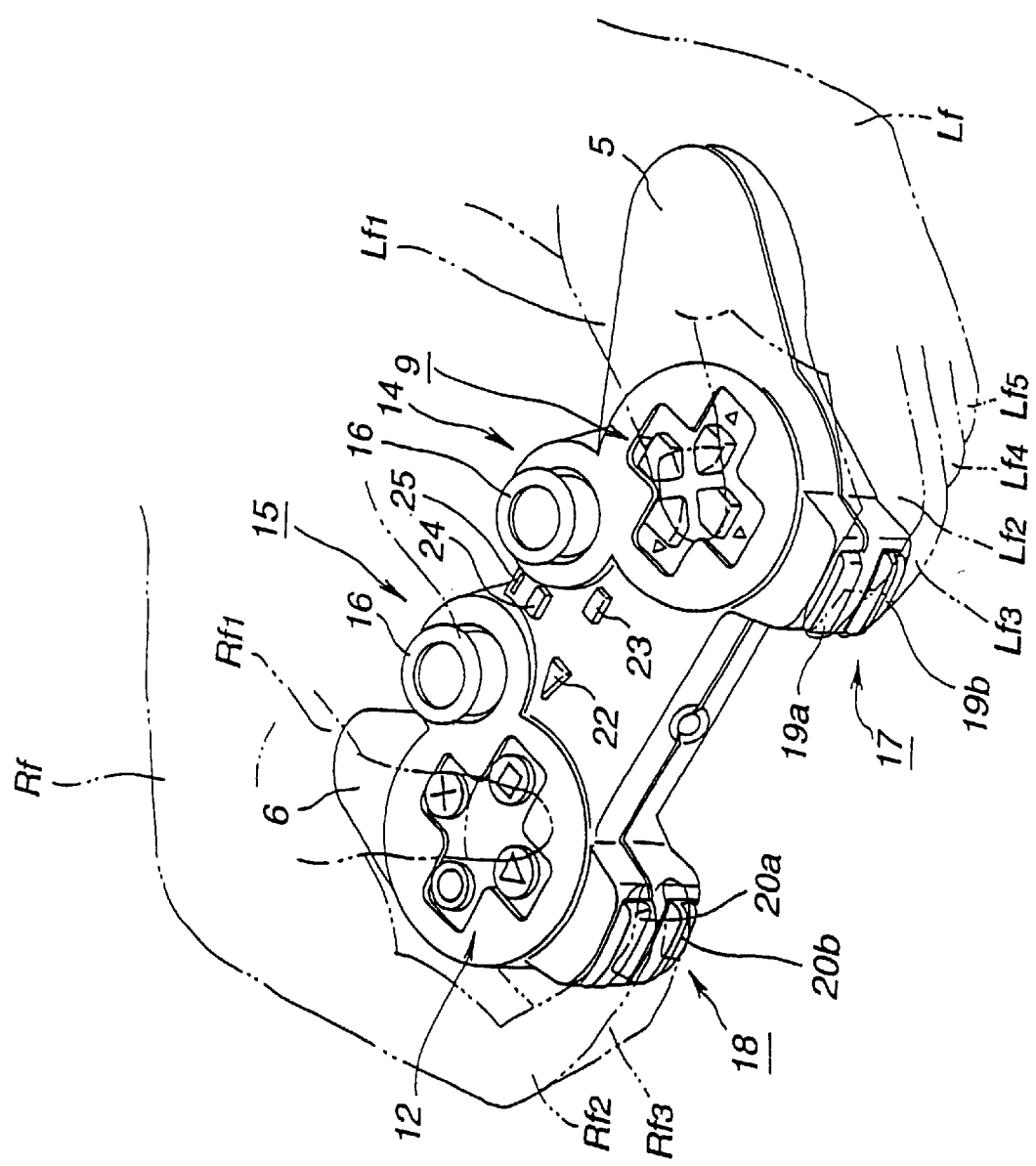
FIG. 7 is a perspective view of the control unit of FIG. 1 in operation.

The housing 4 has concave sections 26 and 27 on the lower side thereof so that, when the player hold the first grip 5 and/or the second grip 6 with his left and right fingers Rf and Lf, respectively, the player may engage his fingers on the concave sections, as shown in FIG. 7. The concave sections 26 and 27 are smoothly curved, as shown in FIGS. 5 and 6.

Fingering section 28 and 29 depend downward from the front side of the housing 4 and adjacent to the concave sections 26 and 27, as shown in FIGS. 5 and 6. More specifically, the fingering sections 28 and 29 depend from the lower ends of bulging portions 31x, 31y at the opposite ends of the front side of the housing 4 of the fifth and the sixth controllers 17 and 18, respectively, as shown in FIG. 2.

In this manner, the player may hold the control unit 1 with his palms abutting against the opposite sides of the projecting grips 5 and 6, respectively, so that the player need not hold the control unit 1 with the fingers. Therefore, the player can have at least six fingers free, and at most ten fingers free, while holding the control unit 1. Consequently, when the player support the fifth and the sixth grips with the palms as shown in FIG. 7, the player can extend, for example, his or her right and left thumbs Rf1 and Lf1, respectively, over the rotary controllers 16 of the third and the fourth controllers 14 and 15, respectively, or over the first through the fourth push buttons 8a–8d of the first controller 9 and over the first through the fourth push buttons 11a–11d as well, so that the player can easily manipulate these controllers with the thumbs Rf1 and Lf1. It would be noted that the rotary controllers 16 of the controllers 14 and 15 are opposingly disposed adjacent the root sections of the grips 5 and 6. That is, they can be reached by the respective thumbs Rf1 and Lf1 of the player who supports the control unit 1 with the palms as described above, so that the rotary controllers 16 may be easily operated by the operator using the thumbs.

It would be understood that the player may easily extend the index fingers Rf2 and Lf2 and the middle fingers Rf3 and Lf3 over the fifth and the sixth controllers 17 and 18, respectively, to selectively push the respective sets of push buttons 19a–19b and 20a–20b, as shown in FIG. 7.

When the control unit 1 is supported by the both palms as described above, the housing 4 is held in position with his or her right and left ring fingers Rf4 and Lf4 and/or right and left small fingers Rf5 and Lf5 resting on the fingering sections 28 and 29 across the concave sections 26 and 27, thereby allowing the player to maneuver precise operations of the controllers 9, 12, 14, 15, 17, and 18 by the fingers.

Figure 8:
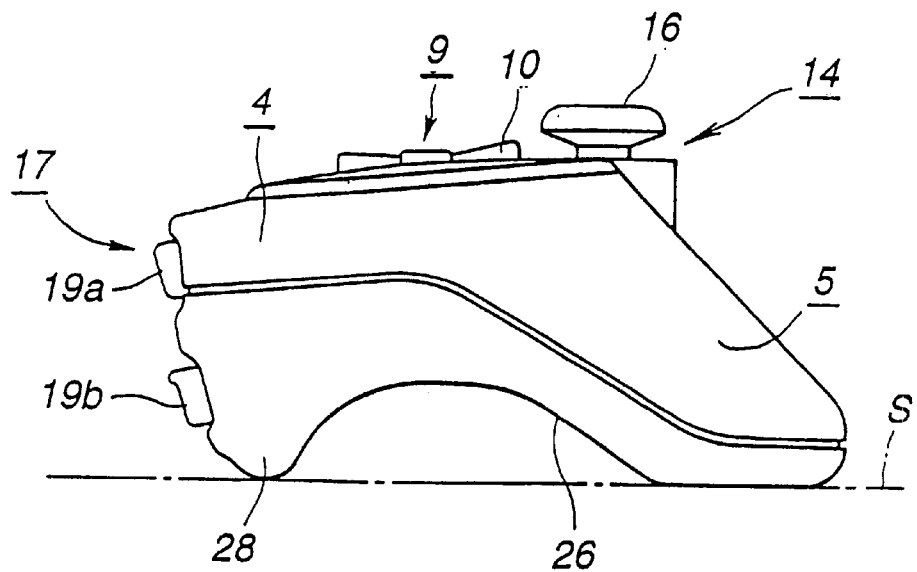
FIG. 8 is a side view of the control unit placed on a flat object.

It should be noted that the control unit 1 may be placed on a flat object S such as a table as shown in FIG. 8. When the control unit 1 is settled in this manner with the tips of the first and the second grips 5 and 6, respectively, and the tips of the fingering sections 28 and 29 abutting on the flat surface, the first through the fourth push buttons 8a–8d of the first controller 9, the first through the fourth push buttons 11a–11d of the second controller 12, and the rotary controllers 16 of the third and the fourth controllers 14 and 15, respectively, lie on substantially the same level with respect to the flat surface S, as shown in FIG. 8. Thus, in this case, the player can advantageously rest both hands on the flat surface S and freely maneuver the six controllers 9, 12, 14, 15, 17, and 18.

Figure 9:
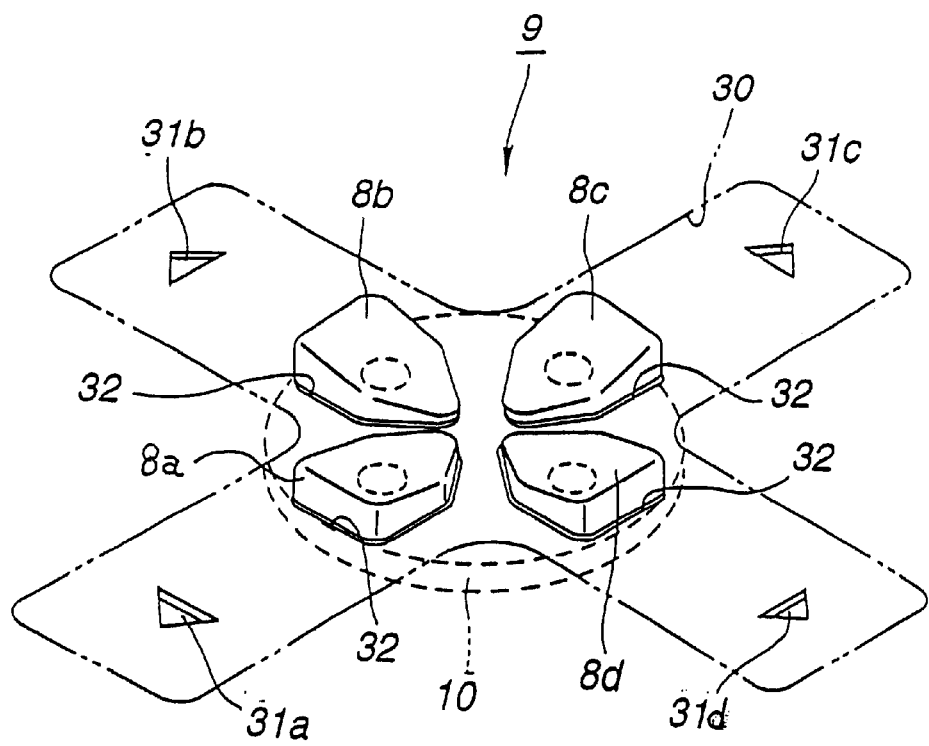
FIG. 9 is a perspective view of the major portion of a first controller according the invention.
Figure 10:
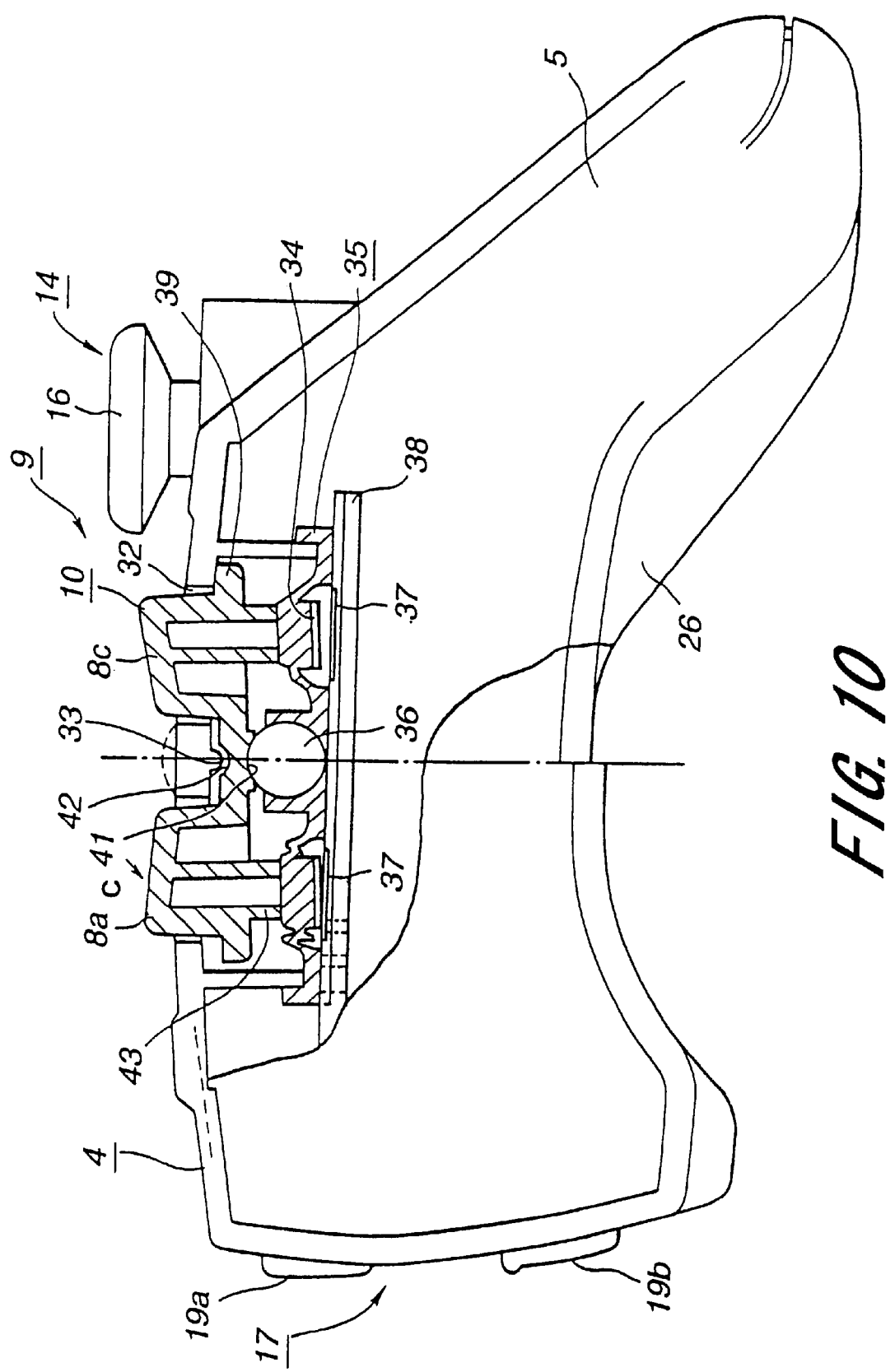
FIG. 10 is a partial cross sectional view of the first controller.

Referring now to FIGS. 9 and 10, the first controller 9 will be described in more detail. The push buttons 8a–8d of the pivotal controller member 10 are formed within and project from a generally cross-shaped recess 30 formed at one end of the upper surface of the housing 4. Direction indicators 31a–31d are formed at four ends of the cross recess 30. Formed radially inside these direction indicators 31a–31d are four mutually perpendicular openings 32 for allowing the four push buttons 8a–8d to project there through, as shown in FIG. 10. At the center of the openings 32 is a central supportive protrusion 33 for supporting the upper center of the pivotal controller member 10. The central supportive protrusion 33 is formed on the inside of the housing 4. Provided under the pivotal controller member 10 is a resilient member 35 having four movable contacts 34 which are operated by the four push buttons 8a–8d. The resilient member 35 has at its center a steel ball 36 serving as a support for supporting the lower end of the pivotal control member 10. There is provided a circuit board 38 having four fixed contacts 37 each associated with the respective movable contacts 34.

As shown in FIGS. 9 and 10, in addition to the four push buttons 8a–8d, the circular base 39 of the pivotal controller member 10 has: a first spherical recess 41 on the underside of the base 39 engaging the spherical surface of the supportive member 36; a second recess 42 at a center of the upper surface thereof engaging the central supportive protrusion 33; and contact guides 43 on the lower side thereof for pressing the back sides of the movable contacts 34 of the resilient member 35. The four push buttons 8a–8d are formed on the base 39 integral therewith such that their thickness becomes greater in the radially outward direction and their mutually opposing ends are tapered in width towards the center of the base 39, as shown in FIG. 9.

The resilient member 35 is located between the circuit board 38 and the pivotal controller member 10, and has movable rubber contacts 34 associated with the respective push buttons 8a–8d.

The spherical supportive member 36 is located so as to engage the first recess 41 formed at the center of the pivotal controller member 10 directly below the central supportive protrusion 33.

Thus, when the pivotal controller member 10 is mounted on the housing 4, the first through the fourth push buttons 8a–8d are positioned radially outwardly from the central supportive protrusion 33. The height of these buttons increases in the radially outward direction. Therefore, the player placing a finger at the center of the cross recess 30 surrounded by the four push buttons 8a–8d can easily diskern his finger position from the protruding configurations of the push buttons and the direction of the button he touches from the inclinations of the button.

Figure 11:
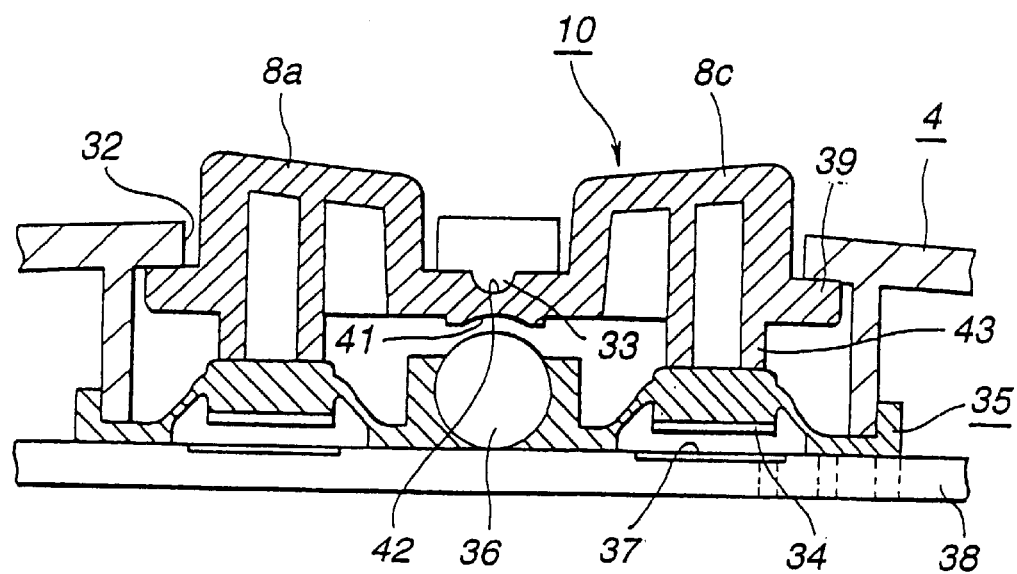
FIG. 11 is a cross sectional view of a first through a fourth sets of push buttons the first controller not in operation.

Having such arrangement as described above, the pivotal controller member 10 of the first controller 9 is pushed up by the resilient force exerted by the resilient member 35 via the contact guides 43 when none of the push buttons 8a–8d are pushed down, bringing the second spherical recess 42 of the pivotal controller member 10 in engagement with the central supportive protrusion 33 as shown in FIG. 11. At the same time the periphery of the circular base 39 abuts on the edge of the opening 32, causing the four push buttons 8a–8d of the pivotal controller member 10 to be seated at their home positions and project out of the upper surface of the housing 4.

Figure 12:
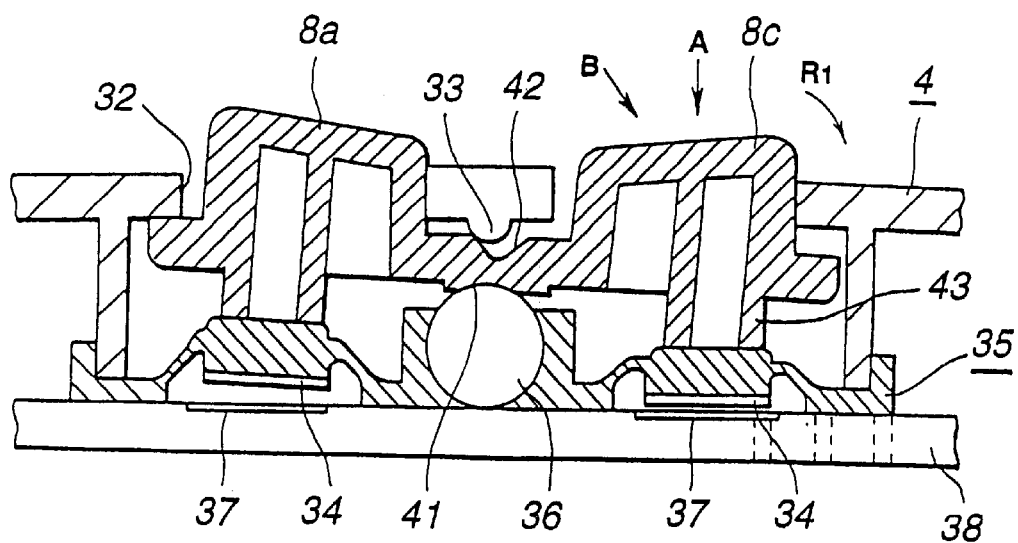
FIG. 12 is a cross sectional view of the second push button of the first controller when it is pushed but not set in operation yet.
Figure 13:
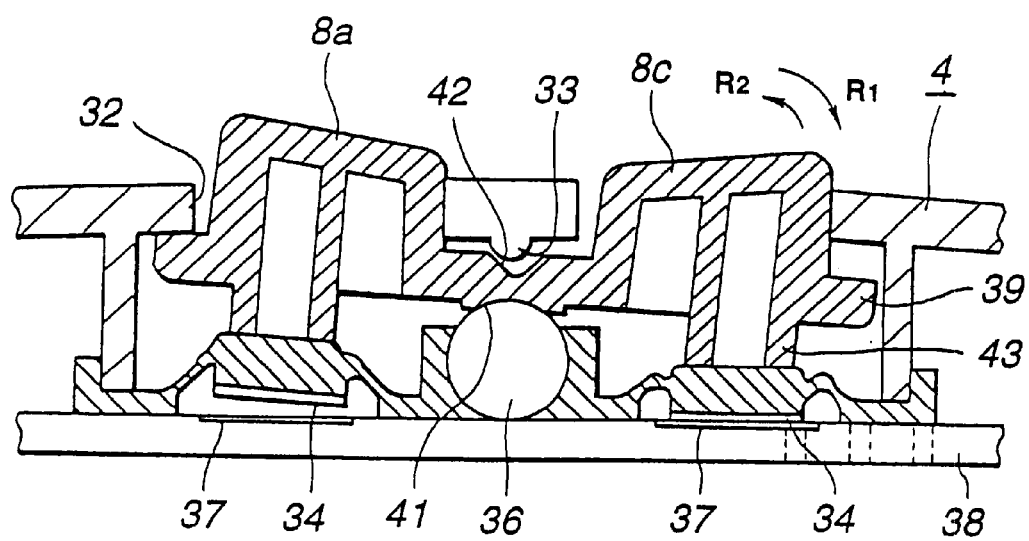
FIG. 13 is a cross sectional view of the second push button of the first controller when it is pushed and set in operation.

When the four push buttons 8a–8d are at their home positions, if the third push buttons 8c is pushed in the direction as indicated by Arrow A or B in FIG. 12, the pivotal controller member 10 is pivoted to the right as indicated by arrow R1 as a result of the pivotal motion of the first recess 41 on the spherical supportive member 36, causing the resilient member 35 to be pushed downward. If the third push button 8c is further pushed, the pivotal controller member 10 is further pivoted on the spherical supportive member 36 in the direction indicated by the arrow R1 as shown in FIG. 13, causing the movable contact 34 to abut on the fixed contact 37 and establishing electrical connection between them.

When the third push buttons 8c is released, the first recess 41 in contact with the spherical supportive member 36 is moved away from the supportive member 36 due to the restoring force of the resilient member 35. That is, the third push button 8c is pivoted in the direction of the arrow R2 as shown in FIG. 13, thereby displacing the movable contact 34 away from the fixed contact 37. If the third push button 8c is further pivoted in the direction of Arrow R2 so that the central supportive protrusion 33 engages the second recess 42, the pivotal controller member 10 restores its home position, as shown in FIG. 11.

On the other hand, if the first push button 8a is pushed forward, i.e. towards the front side of the housing 4 as shown by Arrow C in FIG. 10, the resilient member 35a is deformed and causes the first spherical recess 41 to slide on the supportive member 36, thereby electrically connecting the movable contact 34 with the fixed contact 37.

Thus, the movable contact 34 and the fixed contact 37 constitute a switching device for entering control signals to control the motions of the character.

In this manner, since the pivotal motion of the first through the fourth push buttons 8a–8d of the first controller 9 results from the relative motion of the spherical supportive member 36 to the first spherical recess 41, the pivotal controller member 10 may have a variable stroke in an arbitrary direction, so that it works as a multidirectional switch when it is pressed by the four push buttons.

In addition, because of the smooth contact between the spherical supportive member 36 and the recess first recess 41, smooth, continuous operation of the pivotal controller member 10 may be attained, without cluttering or skewing or offset of the center thereof during the operation.

Figure 15:
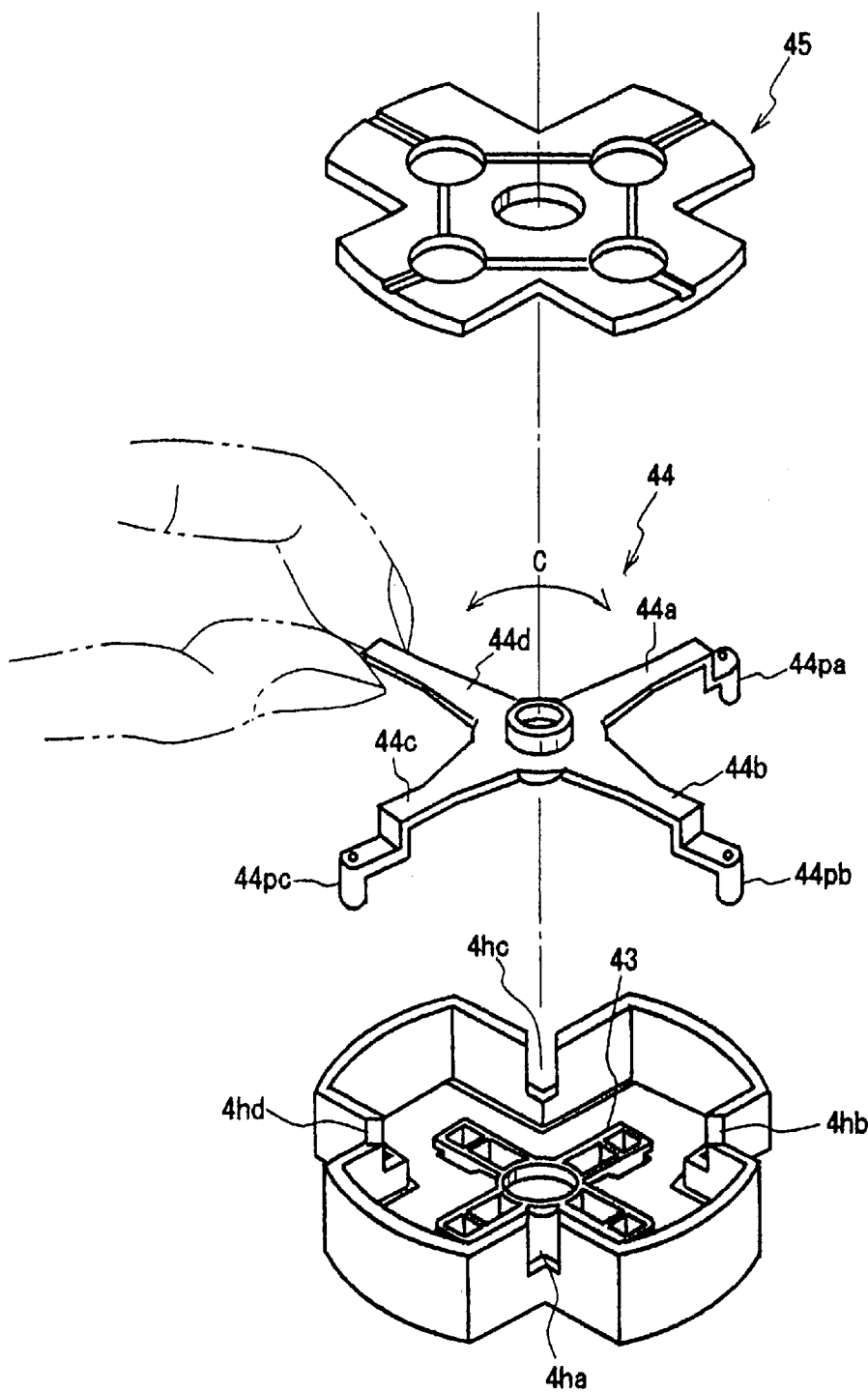
FIG. 15 is an exploded perspective bottom view of a further example of the first controller.
Figure 16:
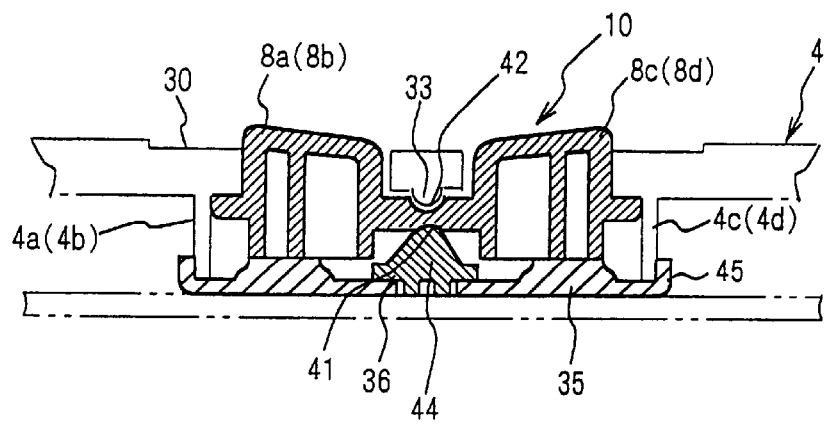
FIG. 16 is a cross sectional view of the first through the fourth sets of push buttons of another first controller, with the push buttons not in operation.
Figure 17:
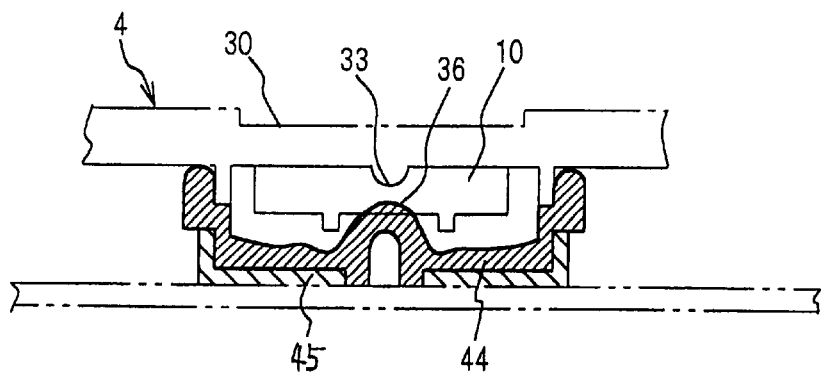
FIG. 17 shows the support member of the first controller shown in FIG. 16 as viewed from a different orientation.
Figure 18:
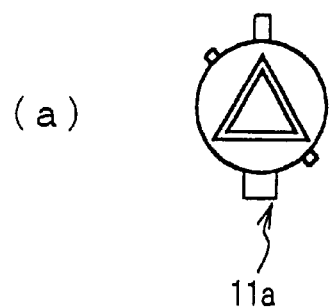
FIG. 18 is a plan view of the indicators of the second controller.
Figure 18:
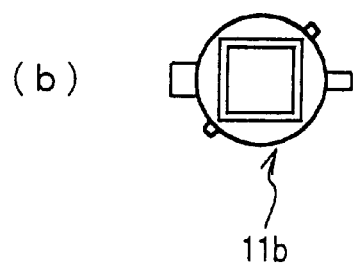
Figure 18:
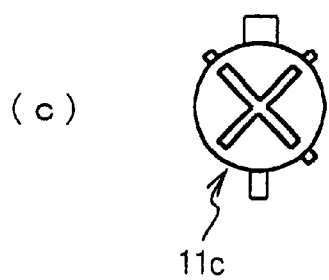
Figure 18:
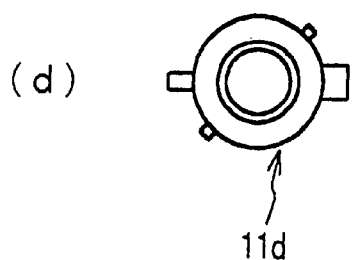

Referring now to FIGS. 14 through 17, there is shown a further example of a controller according to the invention. In this example, a spherical supportive member 36 has a spacer, as described in detail below. FIGS. 17 and 18 illustrates the controller 9 viewed from below.

In contrast, the controller 9 of the first example shown in FIG. 1 has, on the left corner of the upper half section 2 of the housing 4, a generally cross-shaped central recess 30 (FIG. 1), four separated protruding push buttons 8a–8d formed within the cross recess 30 and on the pivotal controller member 10, and the openings 32a–32d (FIG. 9) allowing the four push buttons to project therethrough.

Figure 14:
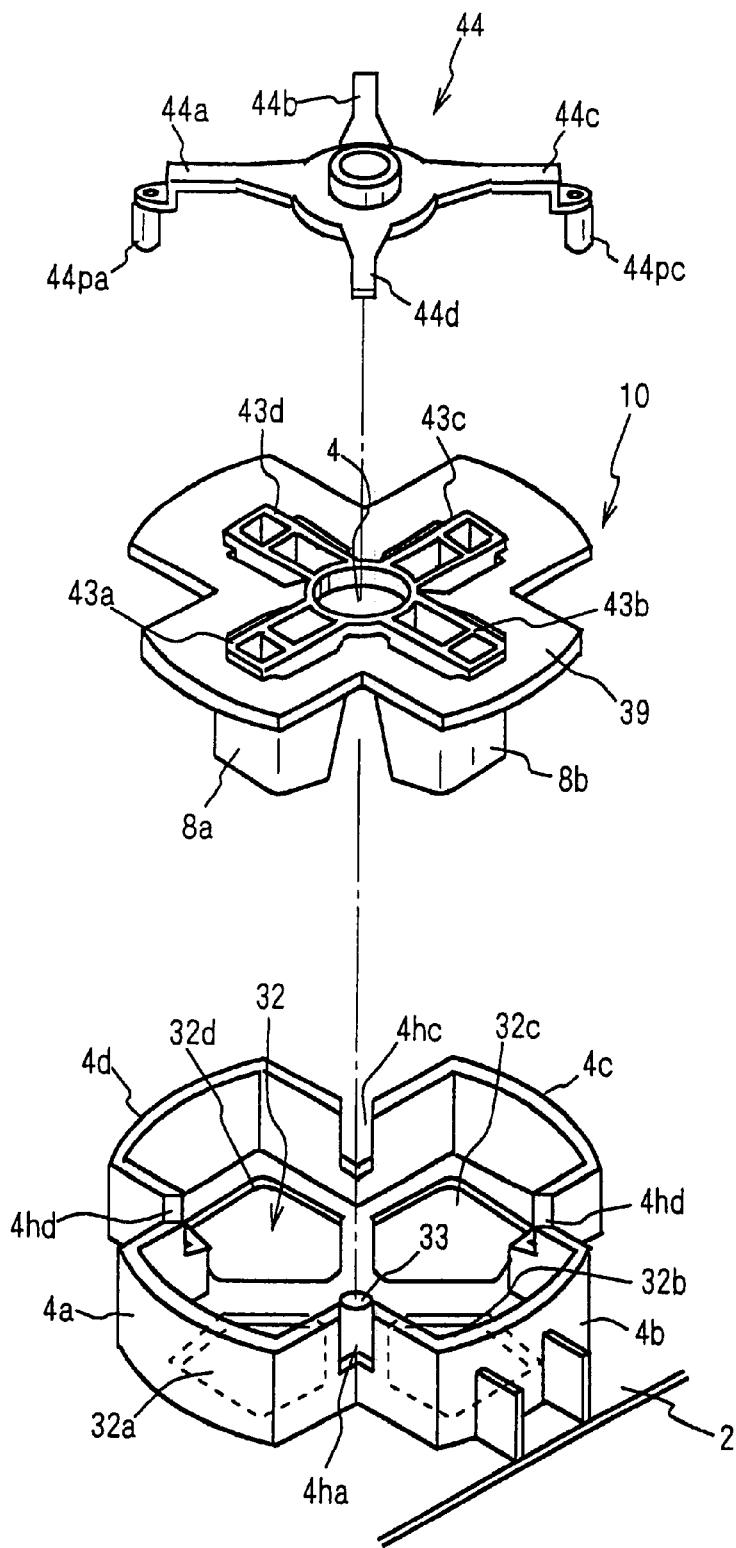
FIG. 14 is an exploded perspective bottom view of another example of the first controller.

FIG. 14 is an exploded view of the first controller 9 of the upper half section of the further example as viewed from below. As shown in the middle figure of FIG. 14, the first controller 9 has: on the backside thereof four radial through-holes 32a–32d each configured to accommodate corresponding one of the four push buttons 8a–8d of the pivotal controller member 10. The first controller 9 also has a generally cross-shaped partitioning walls 4a–4d configured to match the shape of the pivotal controller member 10 under the upper half section 2; and a semi-spherical supportive protrusion 33 formed at the center of the partitioning walls 4a–4d to allow for smooth sliding of the pivotal controller member 10 in an arbitrary direction under the upper half section 2, as shown in the lower figure in FIG. 14. The partitioning walls 4a–4d has four spacer engagement sections or cut out sections 4ha–4hd at each intersecting corner of the walls 4a–4d.

As shown in the middle figure of FIG. 14 the pivotal controller member 10 has on its cross-shaped upper end four protruding push buttons 8a–8d oriented to the center of the pivotal controller member 10 (of which only two buttons 8a and 8b are shown in FIG. 14.) The pivotal controller member 10 is also provided at the center thereof a second semi-spherical recess 42 (not shown in FIG. 14. See FIG. 16.) which is adapted to be in contact with the central supportive protrusion 33 formed at the center of the first controller 9. Provided on the lower side of the cross-shaped controller member 10 are four contact guides 43a–43d associated with the respective push buttons 8a–8d, and a first recess 41 adapted to be in contact with the tip of the central convex supportive member 36 of a spacer 44 (which will be shortly described in detail with reference to FIG. 16).

In addition, the spacer 44 shown in the top figure in FIG. 14 has a cross arms 44a–44d. Of these, three arms 44a–44c each have at the free end thereof a protruding positioning piece 44pa–44pc, while the remaining arm 44d has no positioning piece at its free end (FIGS. 14 and 15). At the center of the cross arms, a protuberant fulcrum 36 is formed, which extends in the direction as the positioning protruding pieces 44pa–44pc.

In assembling such pivotal controller member 10 in the openings 32 of the first controller 9, the upper half section 2 is first turned over upside down, with the through-holes 32a–32d kept down, as shown in FIG. 14. Next, the push buttons 8a–8d are fitted into the corresponding holes 32a–32d, and then the spacer 44 on the push buttons.

In fitting the spacer 44, one may hold, with fingers, a portion of the spacer 44 having no positioning piece, as shown in FIG. 16, and mount the three positioning pieces 44pa–44pd in three of the four spacer engaging sections 4ha–4hd by rotating the arms through an angle of 45 degrees (Arrow C, FIG. 14). A cross rubber sheet 45 (or a resilient member 35) having electric contacts associated with the push buttons of the pivotal controller member 10 is mounted on top of the arms, covering the arms. A base plate (not shown) and the upper half section 2 are then mounted to complete the assembly.

In the first controller 9 thus assembled, the central protrusion 33 disposed at the center of the openings 32 of the upper half section 2 and in association with the center of the pivotal controller member 10 comes into contact with the second recess 42 of the pivotal controller member 10, and at the same time the first recess 41 of the pivotal controller member 10 comes into contact with the spherical supportive member 36 of the spacer 44. Thus, the central region of the pivotal controller member 10 is held in contact on the upper and the lower sides thereof. On the other hand, when none of the push buttons 8a–8d is pushed, the pivotal controller member 10 is upheld by the restoring force of the rubber sheet 45, as shown in FIGS. 16 and 17. In this manner the controller member 10 can undergo a smooth switching operation in any of the four directions about the supportive protrusion 36 of the spacer 44.

The second controller 12 of the control unit 1 will now be described in detail. The second controller 12 is provided on one end of the upper surface of the housing 4, opposite to the first controller 9, as shown in FIGS. 1 and 2. The controller 12 has a generally cross-shaped recess 30. Formed at the four ends of the cross recess 30 are openings 32. A first through a fourth push buttons 11a–11d are formed on the housing 4 with their top ends protruding above the housing 4. Inside the housing 4 are a first through a fourth switching devices which are turned on/off by the four push buttons 11a–11d in entering instruction signals for controlling the motion and other functions of the character.

Provided at the radially remote ends of the push buttons 11a–11d are marks like $\triangle$, $\equiv$, $\times$, $\circ$ indicating the functions of the push buttons, so that the player may easily recognize the functions. The positions of the marks can be correctly determined in relation to the corresponding push buttons when they are assembled, because two of these buttons have different widths than the rest and two of them have the same size so that the angular position of each of the push buttons of the controller 12 can be uniquely determined. In the example shown in FIG. 18, the marks $\triangle$, $\equiv$, $\times$, $\circ$ are assigned to the push button 11a, 11b, 11c, and 11d, respectively.

Marks $\circ$ and $\times$, assigned to the third and the fourth buttons 11c and 11d, respectively, represent "No" and "Yes" instructions, respectively They are used most often in a game and operated by the thumb of the right hand holding the second grip 6. In this manner, even when the control unit 1 includes a multiplicity of controllers, usability of the control unit may be greatly improved by repositioning a minimum number of push buttons at convenient locations, as is seen in the above example for the third and the fourth push buttons 11c and 11d.

It is apparent that the four push buttons 11a–11d may be colored differently so that their functions can be easily distinguished by color.

The third and the fourth controllers 14 and 15, respectively, will now be described in detail. As shown in FIG. 1, the third and the fourth controllers 14 and 15, respectively, are mounted in a pair of generally cylindrical adapter 47 and 48, respectively, which are located in between and adjacent to the opposing root sections of the first and the second grips 5 and 6, respectively, as shown in FIG. 1.

Since the third and the fourth controllers are identical in structure, only the third controller 14 will be described below.

Figure 19:
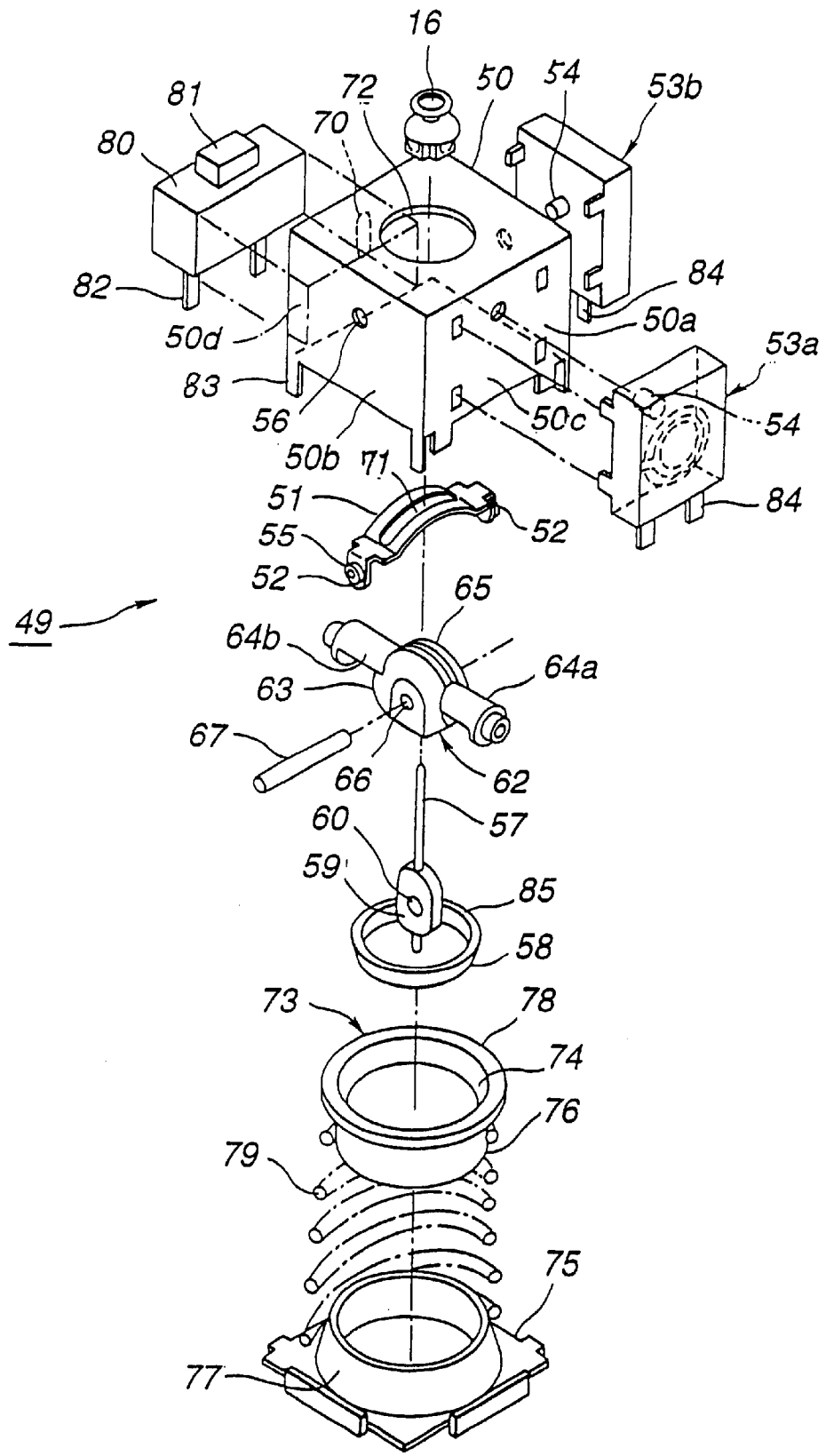
FIG. 19 is an exploded perspective view of a multi-directional input device used for the third and the fourth controllers.

The third controller 14 is provided with a multi-directional input device 49 as shown in FIG. 19. The multi-directional input device 49 has a box-shaped upper frame 50 and a first arcuate, functionally co-operative member 51, as shown in FIG. 19. The first co-operative member 51 has a folded end 52, with which a rotary shaft 54 of a first variable resistor 53b (serving as a rotation detector) mounted on one frame 50. Another folded end 52 of the first co-operative member 51 has a protrusion 55, which is rotatably fitted in a hole 56 formed in the opposite side wall 50b. Thus, the first co-operative member 51 is rotatably mounted on the upper frame 50.

A controller shaft 57 is provided at the center of the upper frame 50. The controller shaft 57 is provided at the lower end thereof a disk-shaped control member 58, and at an intermediate section thereof a circular plate 59. The circular plate 59 has a small hole 60 for receiving therein a pin 67. The rotary controller 16 is mounted on the upper end of the controller shaft 57.

A second functionally co-operative member 62 is provided in the frame 50 perpendicularly to the controller shaft 57. The second co-operative member 62 is provided at the center thereof with a spherical member 63, from which extends a pair of arms 64a and 64b. An elongate vertical slot 65 is formed through the sphere 63, for accommodating therein the controller shaft 57 and the circular plate 59. In assembling the multi-directional input device 49, the controller shaft 57 and the disk 59 are inserted in the elongate slot 65 until a small hole 60 formed in the disk 59 and a horizontal hole 66 formed in the sphere 63 are aligned with each other. The pin 67 is then inserted through the holes 66 and 60 so that the controller shaft 57 rotatably mounted on the second co-operative member 62 is movable in the elongate slot 65.

One arm 64a of the second co-operative member 62 is connected with the rotary shaft 54 of the second variable resistor 53a which is fixed on one side 50c of the upper frame 50, while the other arm 64b passes through a vertically elongate hole 70 formed in the side 50d of the upper frame 50 and projects out of the side 50d. The controller shaft 57 penetrating through the elongate slot 71 of the first co-operative member 51 projects upward from the hole 72 of the upper-frame 50.

The controller shaft 57 is supported on top of a return member 73. The return member 73 has an upper recess for receiving therein dish-shaped control member 58.

A lower frame 75 is mounted on the underside of the upper frame 50. The lower frame 75 has a generally cylindrical supporting wall 77 for receiving therein a flange 76 of the return member 73 so as to allow free vertical motion of the flange. A helical return spring 79 is provided between the lower frame 75 and the periphery 78 of the return member 73, so that the member 73 is urged upward by the spring 79. The end of the arm 64b of the second co-operative member 62 is abutted against the upper rim of the elongate vertical hole 70 of the side 50d of the upper frame 50. The second co-operative member 62 is rotatably mounted on the upper frame 50, below the co-operative member 51, and is oriented in a direction perpendicular to the first co-operative member 51.

Mounted on the side 50d of the upper frame 50 is a push button type switching device 80 which may be turned on by pushing its button 81 against the restoring force exerted by a spring in it. The button 81 has an end portion 82 which faces the end portion of the arm 64b of the second co-operative member 62 and projects in the same direction as the mounting legs 83 of the upper frame 50 provided at the lower end thereof and terminals 84 of the first and the second variable resistors 53a and 53b, respectively.

Operation of the multi-directional input means 49 will now be described.

As the player touches the rotary controller 16 and applies a force in one direction, the controller shaft 57 is pivoted about the point of intersection of the axes of the co-operative member 62 and the pin 67, causing the first co-operative member 51 and the second co-operative member 62 to rotate in that direction, which in turn causes the shafts 54 of the variable resistors 53a and 53b to be rotated accordingly, varying the resistances thereof.

An automated return mechanism of the shaft 57 will now be described.

Figure 20:
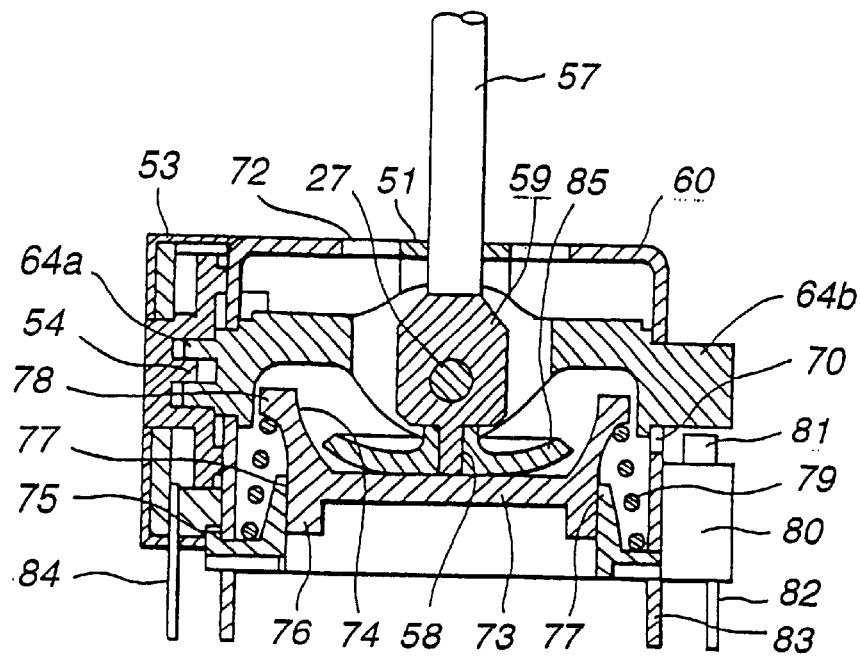
FIG. 20 is a cross sectional view of a controller shaft of the multi-directional input device at its home position.
Figure 21:
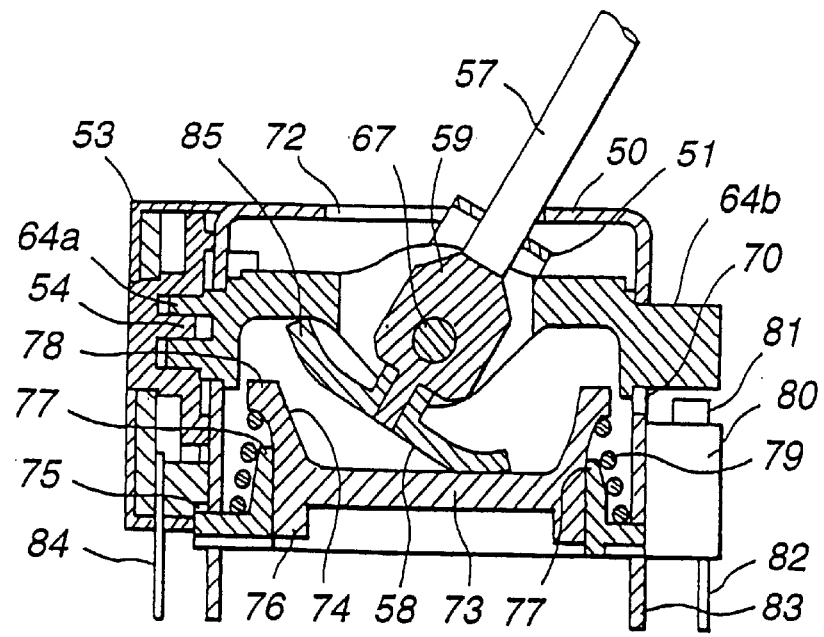
FIG. 21 is a cross sectional view of the controller shaft in a rotated position.

When the controller shaft 57 is not in operation, it assumes the upright or neutral home position, in the upper hole 72 of the upper frame 50. In this case, the lower surface of the dish-shaped control member 58 and the inner bottom surface of the lower frame 75 are repelled apart by the return spring 79. If the controller shaft 57 is inclined in the clockwise direction as shown in FIG. 21, a curved flange 85 of the controller 58 extending outwardly from the shaft 57 with an increasing radius of curvature pushes down the return member 73 along the wall 77 against the action of the return spring 79. If the external force is removed from the controller shaft 57, the shaft 57 is returned to the upright home position by the restoring force of the spring 79 as shown in FIG. 20.

Operation of the switching device 80 will now be described with reference to FIGS. 22 and 23.

Figure 22:
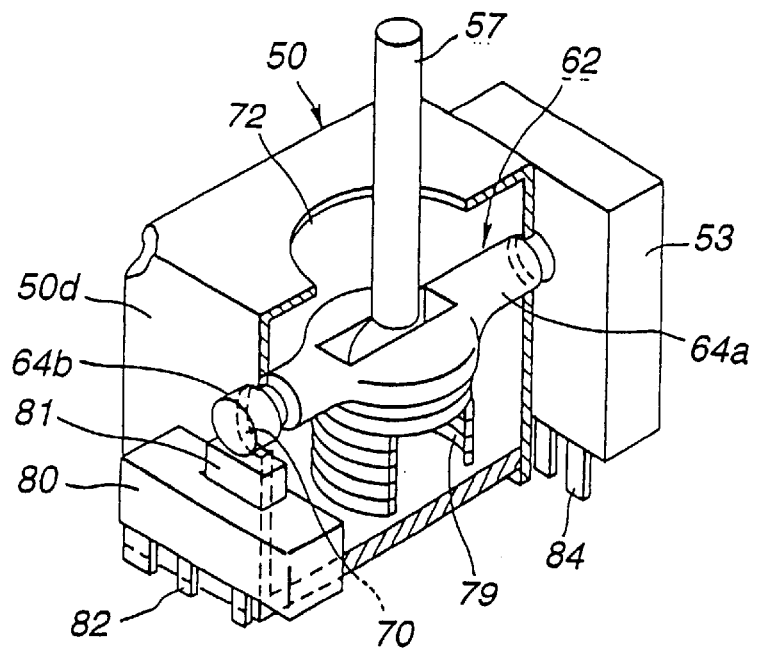
FIG. 22 is a partially cut exploded perspective view of the multi-directional input device for activating push-button type switching elements.
Figure 23:
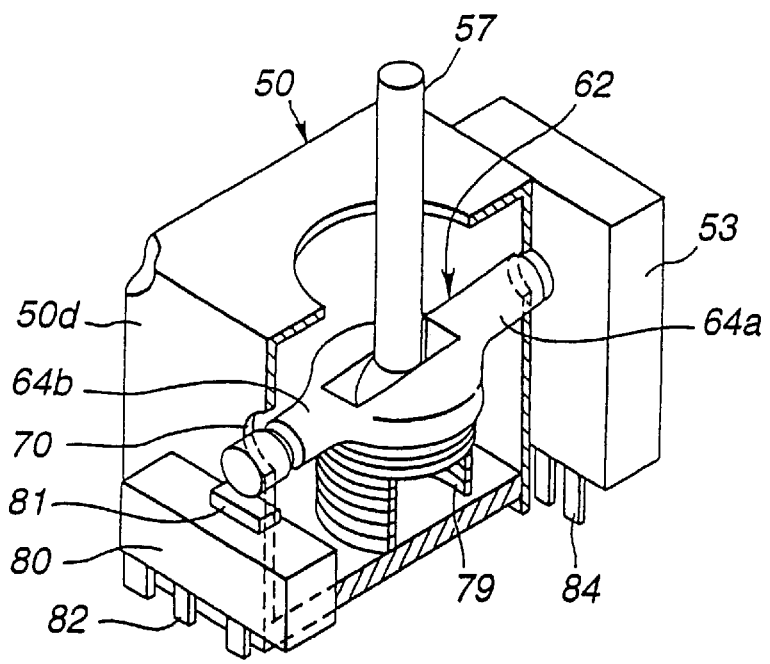
FIG. 23 is a view of the multi-directional input device shown in FIG. 22 as it operated.
Figure 24:
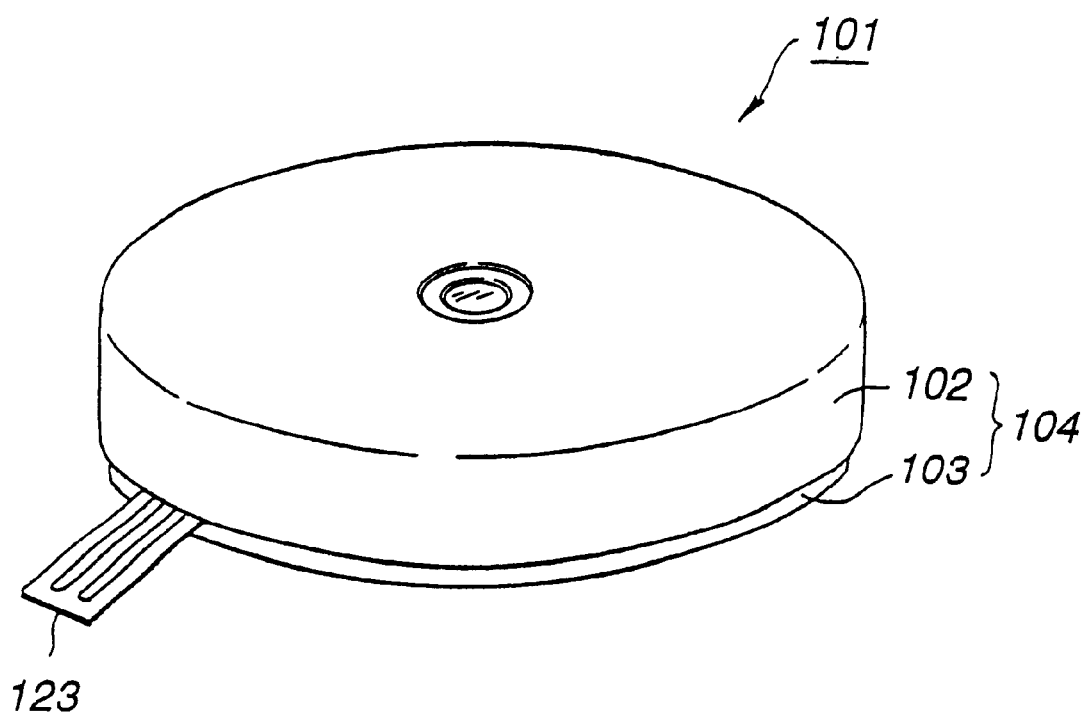
FIG. 24 is a perspective view of a vibration motor for use in a control unit of invention.
Figure 25:
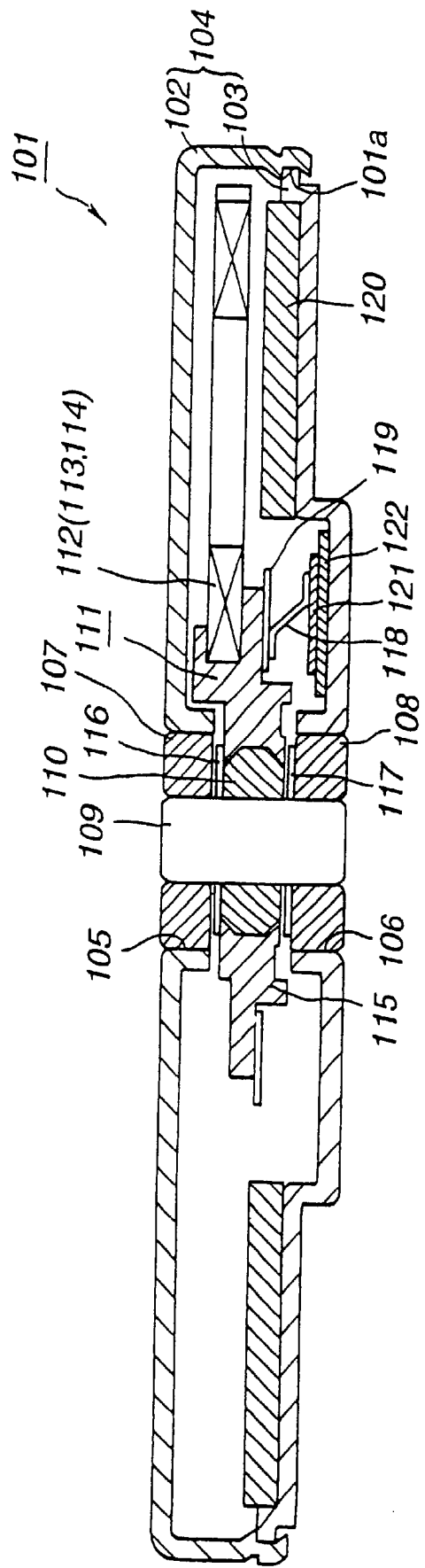
FIG. 25 is a cross sectional view of the vibration motor shown in FIG. 24.

When the controller shaft 57 is held at the home position as shown in FIG. 22, the arm 64b of the second co-operative member 62 is urged by the return spring 79 to abut on the upper edge of the elongate vertical slot 70 and hence separated from the push button 81 of the switching device 80. If the shaft 57 is pushed downward, the arm 64b is rotated downward against the action of the return spring 79 about a point where the arm 64a engages the rotary shaft 54 of the first resistor 53a, until the arm 64b abuts on the lower edge (serving as a stopper) of the elongate vertical hole 70. Meanwhile the end of the arm 64b forces the button 81 of the switch 80 downward, thereby turning on the switch 80. If the shaft 57 is released from the external force, the end of the arm 64b is returned to its home position, i.e. the upper edge of the elongate vertical slot 70, by the return spring 79 as shown in FIG. 22. It should be understood that the switching action of the controller shaft 57 on the switching device 80 is not influenced by the inclination of the shaft 57.

The rotations of the controllers 16 of the third and the fourth controllers 14 and 15 thus result in changes in resistance of the first and the second variable resistors 53a and 53b, respectively. The resultant changes in resistance of the resistors are reflected on the motion of the character. Hence, the player may use the controllers 14 and 15 to attain, for example, a continuously accelerated movement of the character, or simultaneous rotation and advance of the character, or a change in the character's sight.

The fifth and the sixth controllers 17 and 18, respectively, provided on the front side of the housing 4 will now be described.

The controllers 17 and 18 include a first and a second sets of push buttons 19a–19b and 20a–20b, respectively, which project forward out of respective sets of openings 91 formed in the front end of the housing 4. Each set of the openings 91 has an upper and lower openings in parallel with each other. Provided inside the housing 4 are switches associated with the respective push buttons 19a–19b, and 20a–20b.

In order to enhance virtual reality of the game, the control unit 1 is provided with a vibration motor 101 for generating vibrations in response to a given signal received from the game machine.

The vibration motor 101 has a casing 104 which consists of a flattened cylindrical upper element 102 and a disk-shaped bottom plate 103 for covering the opening 101a of the upper casing element 102. Metal bearings 107 and 108 are fitted in the central bores 105 and 106, respectively, formed in the upper element 102 and in the bottom plate 103, respectively. A drive shaft 109 is rotatably mounted on the metal bearings 107 and 108. The drive shaft 109 does not project from the casing 104.

Figure 26:
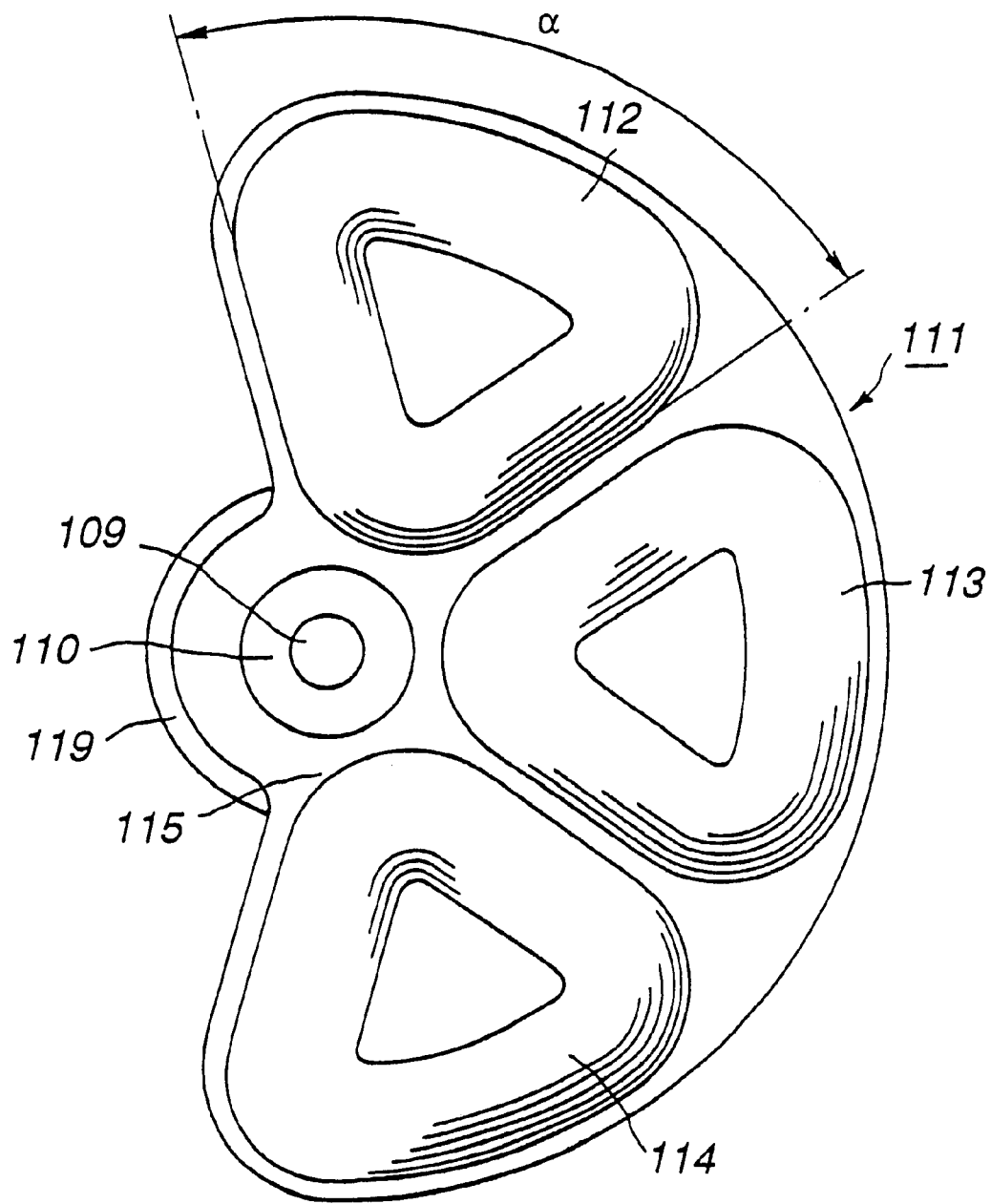
FIG. 26 is a plan view of a rotor for use in the vibration motor.

The drive shaft 109 is provided with a rotor firmly secured on a metal holder 110 connected with the drive shaft 109. The rotor 111 has three eccentric armature coils 112, 113, and 114 electrically connected together. These coils are angularly displaced about the drive shaft 109 in an asymmetric arrangement, generally in the shape of a fan, as shown in FIG. 26. Specifically, the coils 112, 113, and 114 are each wound in the shape of a fan having a central angle alpha of 65 degrees, and placed side by side about the shaft 109. Thus, the rotor 111 as a whole has a generally fan shaped configuration. The rotor 111 is supported by a metal holder 110. Coils 112, 113, and 114 are supported by a plastic supporting plate 115 which is insert-molded together with a metal holder 110.

Slider plates 116 and 117 are provided between the metal bearings 107 and 108 and holder 110 for facilitating smooth rotation of the rotor 111.

Mounted on the underside of the rotor 111 facing the bottom plate 103 is a connection plate 119 having a brush 118. The connection plate 119 is electrically connected with the coils 112, 113, and 114.

Arranged on the bottom plate 103 is an annular stator magnet 120 facing the rotor 111. In addition, radially inside the magnet 120, a brush base 121 is provided in contact with the brush 118. The brush base 121 is mounted on the brush panel 122 secured on the bottom plate 103. The brush panel 122 is connected to a power supply by a line 123.

In this arrangement the vibration motor 101 is rotated when the coils 112–114 are energized by the power supply via the power supply line 123. The rotor 111 then undergoes vibratory rotations because of the eccentric arrangement of the coils 112–114 with respect to the drive shaft 109.

In the example shown herein, the vibration motor can advantageously generate vibrations without any further eccentric member, since the rotor 111 itself has an eccentric configuration with respect to the drive shaft 109. Hence it can be manufactured in a compact form. Furthermore, since the motor does not require an external eccentric member, and hence the drive shaft may be enclosed in the casing 104, the motor can be made very thin.

Figure 27:
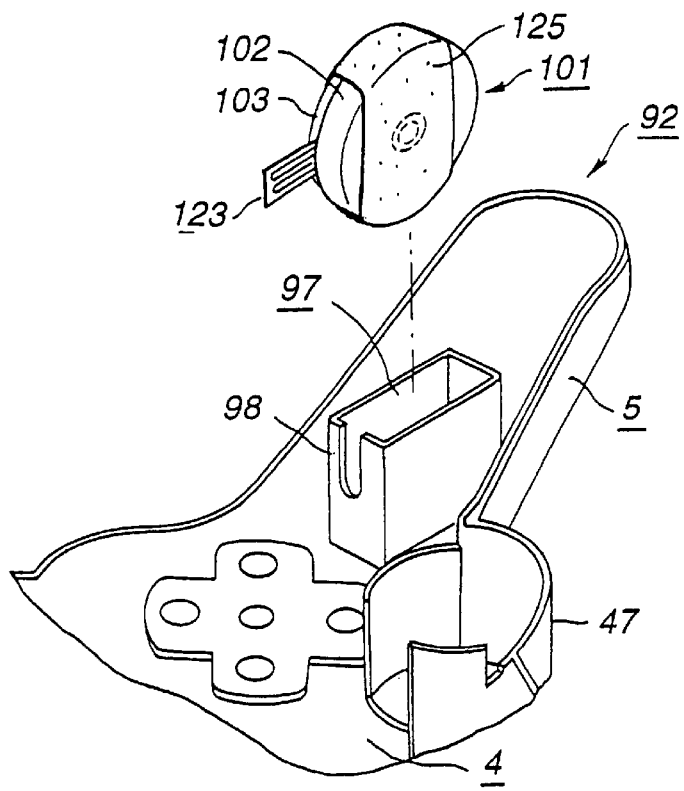
FIG. 27 is a perspective view of the vibration motor and a first grip of the control unit, showing how the motor is mounted in the first grip.
Figure 28:
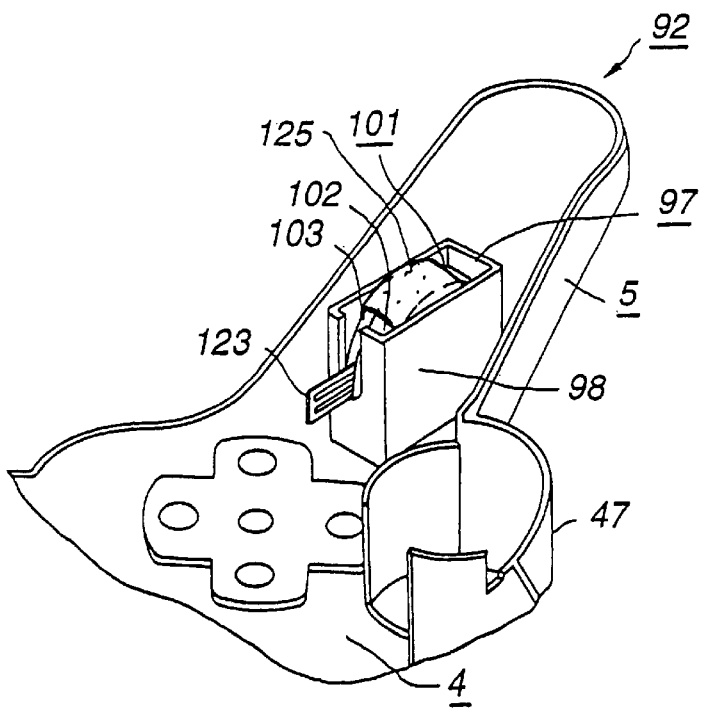
FIG. 28 shows the vibration motor mounted on the first grip of the control unit

The vibration motor thus configured is mounted in a generally parallelepiped motor adapter 97 located inside the first grip 5, as shown in FIGS. 27 and 28. In the example shown herein, the periphery of the vibration motor 101 is covered with a resilient sheet 125, such as a rubber sheet, which facilitates intimate contact of the motor 101 with the grip 5 so that the vibrations of the motor is efficiently transmitted to the player via the grip 5.

The control unit 1 may be provided with a further vibration motor 101 in the second grip 6. It would be apparent that the vibration motor(s) 101 may be mounted anywhere inside the housing 4, so long as the vibrations of the motor(s) 101 can be transmitted to the hand(s) of the player. In a case where two vibration motors 101 are mounted in both of the grips 5 and 6, these motors can have different frequencies and vibration intensities It would be apparent to those skilled in the art that a printed circuit board (not shown) including a necessary electronic circuit is provided in the housing 4 for carrying out exchanging control signals and other signals between the control unit 1 and the game machine.

Figure 29:
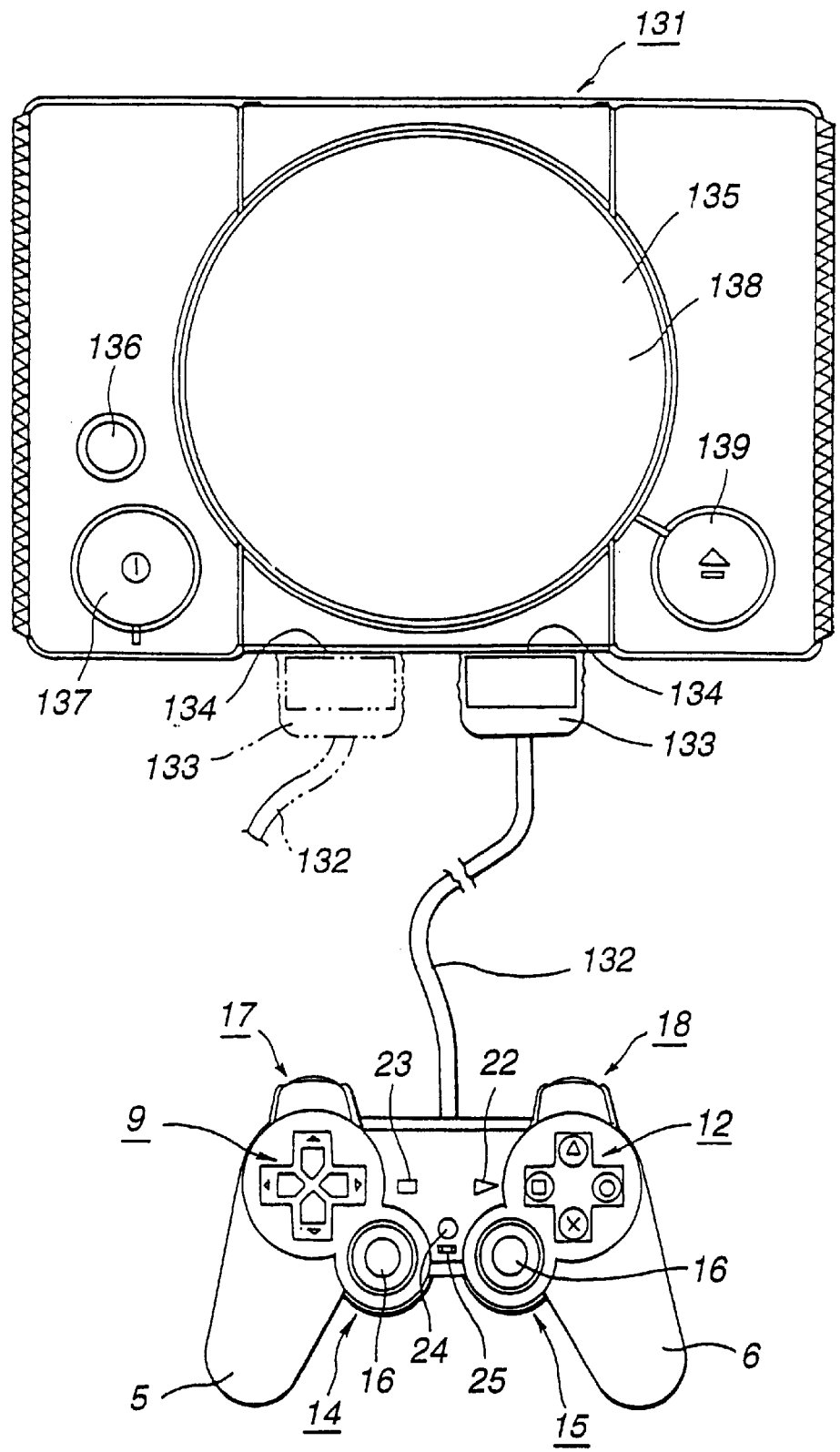
FIG. 29 is a plan view of the control unit of the invention connected to the main unit of a game machine.

The control unit of the invention having such a structure as described above is connected with the main unit 131 by means of a connection cord 132, as shown in FIG. 29.

The connection cord 132 has at the free end thereof a connector 133, which is coupled with a jack 134 provided on one side of the main unit 131.

The main unit 131 may have additional jacks 134 for additional control units to be connected therewith.

The main unit 131 of the game machine also includes other devices such as a disk drive 135 for retrieving a game program stored thereon, and a graphic processor for displaying the game character on the TV display together with a background picture, in addition to such devices as a reset switch 136 for resetting the on-going game, a power witch 137, a button 139 to open/close the cover 138 of the disk drive 135.

The main unit 131 can be connected to a TV set serving as a display for the game machine to display the character and a background picture.

It would be understood that in order to enable the vibration motor 101 to vibrate the entire control unit 1 in response to a signal received from the main unit 131, the main unit 131 and the control unit 1 must have a bi-directional communication system.

Figure 30:
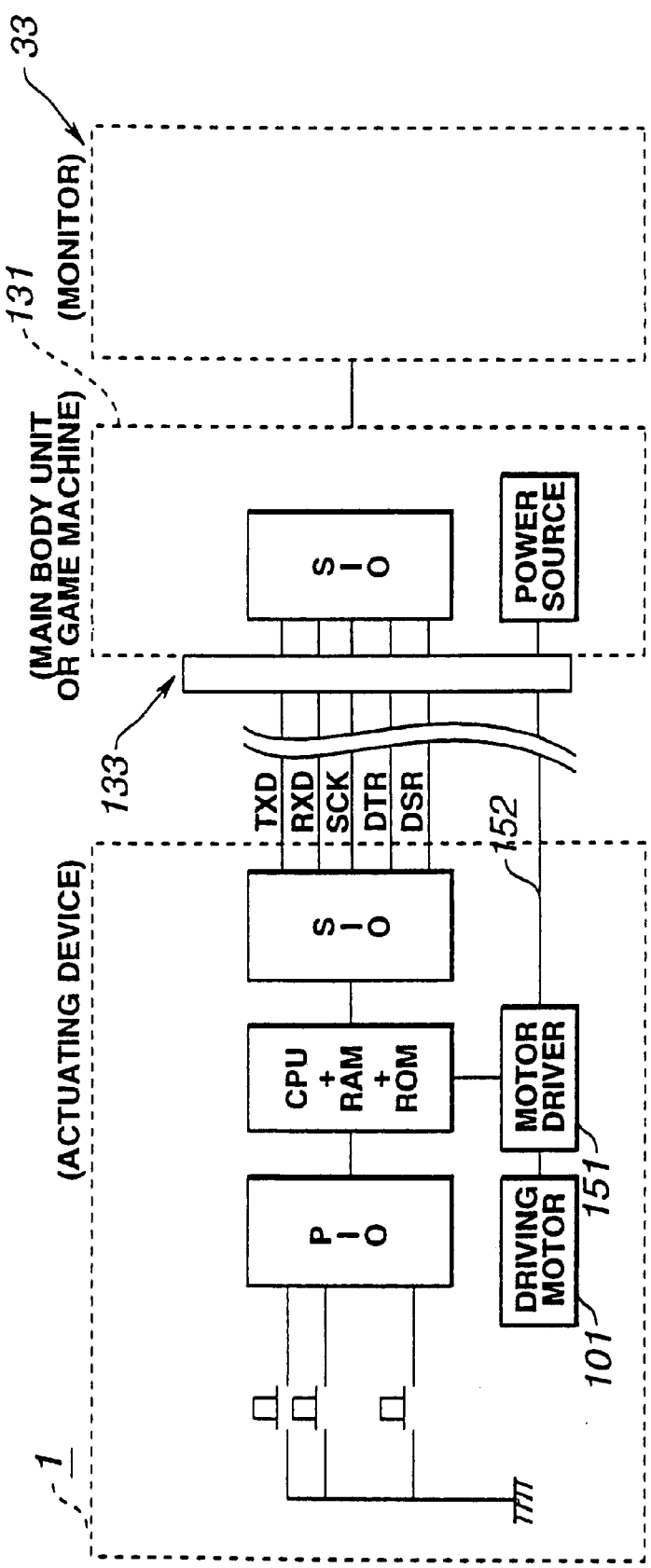
FIG. 30 is a block diagram representation of the major section of a communication system for bi-directional serial data communication between the control unit of the invention and a game machine.

Such bi-directional communication system can be provided by a bi-directional connector 133 connecting the control unit 1 with the main unit 1 as shown in FIG. 30.

The facility required by the control unit 1 for the bi-directional communications includes, for example: a serial I/O interface SIO for data exchange with the main unit 131; a one-chip microcomputer that includes a parallel I/O interface PIO, a CPU, a RAM, and a ROM for inputting and processing control data received from a multiplicity of the controllers; and a motor driver 151 for setting the vibration motor 101 in vibratory rotation. The vibration motor 101 is energized by the electric current supplied through the motor driver 151.

The bi-directional serial connector 133 of the control unit 1 is connected with the serial I/O interface SIO of the main unit 131. Details of other known components are not described any further.

The bi-directional serial communications line and a control line of the game machine include: a data transmission line TXD (Transmit X' per Data) for transmitting data from the main unit 131 to the control unit 1; data transmission signal line RXD (Received X' per Data) for transmitting data from the control unit 1 to the main unit 131; a serial signal line SCL (Serial Clock) for clocking signals to extract data from the data transmission lines TXD and RXD; a control line DTR (Data Terminal Ready) for establishing/interrupting data transmission with a terminal device, which is in this case the control unit 1; and a data flow control line DSR (Data Set Ready) for controlling a huge flow of data.

The cord 132 accommodating the serial data communications lines and the control lines may also include a power supply line 152 for directly deriving power from the power supply of the main unit 131 as shown in FIG. 30. This line 152 is connected with the motor driver 151 of the control unit 1 and delivers power to the motor 24.

In operation, the main unit 131 of the game machine as shown in FIG. 29 first outputs selection data onto the control signal line DTR to establish communication with an active control unit 1 prior to acquisition of the operational data or the instructions received from the first through the sixth controllers 9, 12, 14, 15, 17, and 18 of the active control unit 1. Upon reception of this selection data, the control unit 1 returns an acknowledgment indicating that the control unit 1 has been selected by the control line DTR. The control unit 1 assumes a mode for receiving data via the line TXD. To verify the control unit 1, the main unit 131 of the game machine sends an identification code for the control unit 1 onto the data transmission line TXD, which will be received by the control unit 1.

The control unit 1, verified by the identification code, may establish bi-directional communication with the main unit 131. The main unit 131 then sends control data to the control unit 1 via the data transmission line TXD, and operational data input by the control buttons of the control unit 1 is transmitted to the main unit 131 via the data transmission line RXD. In this manner the bi-directional serial communication is maintained between the main unit 131 and the control unit 1 until the main unit 1 issues a selection termination signal to the control unit 1 via the control line DTR, when the communication is terminated.

Thus, in the game machine having a bi-directional communication facility, the control unit 1 may send operational data to the main unit 131 while the main unit 131 may send or feed back to the control unit 1 via the data transmission line TXD a control signal instructing activation of the vibration motor 101 This control signal (referred to as motor activation signal) is embedded in the game program stored on the optical medium such as a CD-ROM, and is fed therefrom to the control unit 1 by the main unit 131 for a predetermined period of time in accordance with a character's motion aimed by the operator of the control unit 1.

Figure 31:
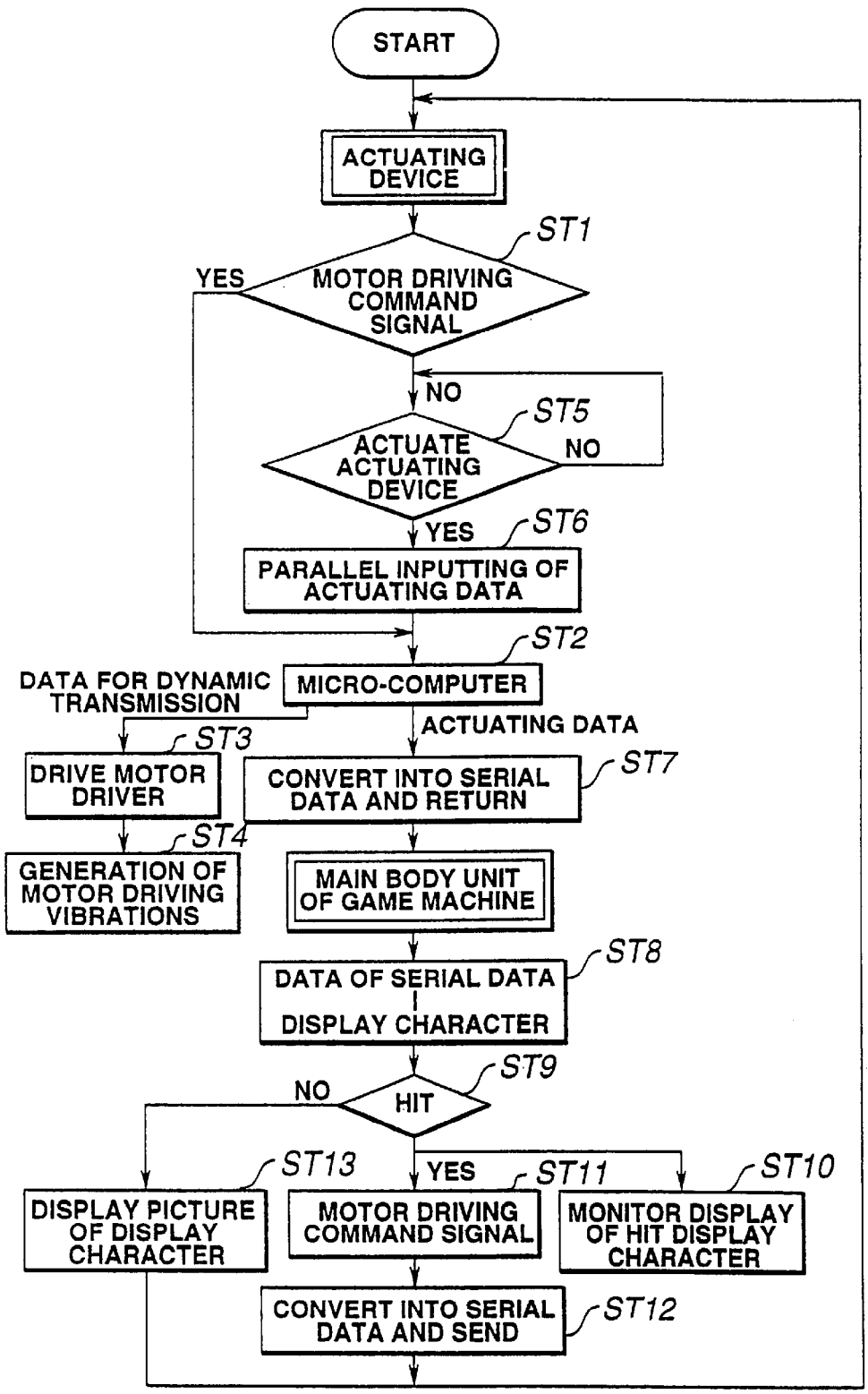
FIG. 31 is a flow-chart illustrating a procedure for establishing data communications between the control unit of the invention and a game machine.

Referring to FIG. 31, there is shown a flow chart illustrating a procedure in which the vibration motor 101 is driven based on the instruction signal supplied by the main unit 131 in accordance with the invention.

To start the game, an optical disk or CD-ROM storing thereon the game software is inserted in the main unit 131. If the start switch 22 of the control unit 1 is turned on, the game software is started up. Control buttons are used to set up various functions for the character of the game. The player is now ready to play the game, using the first through the sixth controllers 9, 12, 14, 15, 17, and 18.

During the game, the microcomputer of the control unit 1 monitors if a motor activation signal is received from the main unit 131 via the serial I/O interface SIO. The motor activation signal includes control data to control the electric current supplied to the motor and the duration of the activation. If, during the game, it is determined in Step ST1 that the data received from the main unit 1 includes a motor activation signal, then the data received is processed by the microcomputer (Step ST2), and the motor driver 151 shown in FIG. 30 is activated (Step ST3) by supplying the vibration motor 101 with an electric current delivered from the main unit 131 for a predetermined period of time (Step ST4).

If on the other hand no motor activation signal is found in Step ST1, then a determination is made in Step ST5 whether any one of the controllers 9, 12, 14, 15, 17, and 18 has been operated. If the result of the determination is "YES", data representing the operation (hereinafter referred to as control data) is entered in the microcomputer via the parallel I/O interface PIO.

The control data entered in the microcomputer is processed therein in Step ST2, which data is transformed into a serial data in Step ST7 and transmitted to the main unit 131 via the serial I/O interface SIO as shown in FIG. 30.

Upon reception of the serial control data, the main unit 131 compares the data owned by the character (hereinafter referred to as character's data) with the serial control data in Step ST8.

If it is found in Step ST9 that the character's data hits the serial control data, that is, the character's data matches the serial control data, the hitting character's data is displayed on the display screen in Step 10 and generates a motor activation signal in Step 11. In Step ST12, the motor activation signal is transformed into a serial data set and output to the control unit 1 as a specific response signal, via the serial I/O interface SIO shown in FIG. 30. When this motor activation signal is detected by the microcomputer of the control unit 1, electric power is supplied from the motor driver 151 to the vibration motor 101 in the manner as described in connection with Steps ST1, ST2, and ST3, thereby generating vibrations in the motor and accordingly through the entire control unit 1.

If the control data does not hit character's data, a pose of the character as instructed by the player through the operation of the controllers 9, 12, 14, 15, 17, and 18 is displayed on the screen (Step ST13). The procedure then returns to Step 1 to continue the game.

In the example shown above, it is assumed that the motor activation signal is transmitted from the main unit 1 to the control unit 1 in response to a predetermined data received from the control unit 1. However, it would be apparent that the motor activation signal may be transmitted by main unit 131 to the control unit 1 based on a determination made by the main unit 131 itself.

As described previously, the control unit 1 of the invention may be held by supporting the grips 5 and 6 with both palms. Meanwhile the player can use the ten fingers to operate the first through the sixth controllers 9, 12, 14, 15, 17, 18, respectively. The controllers can be operated while supporting only one of the grips 5 and 6. That is, the player can give the character not only a simple 2-dimensional translational motion but also a 3-dimensional rotation or spinning and/or an accelerated move. In addition to such sophisticated performance of the game, the system of the invention can provide enhanced virtual reality by giving the player vibrations in response to a development of the game.

The game machine of the invention is thus capable of controlling sophisticated movements of a character and giving the player excellent virtual reality. The game machine of the invention can be used, for example, for a game involving three players maneuvering airplanes and/or submarines in a 3-dimensional virtual space.

It should be appreciated that, because of a vibration motor installed within the control unit which is activated by a signal received from the main unit of the system, a control unit of the invention and a system utilizing such system may advantageously provide the operator with vibrations that enhances the virtual reality of the program. Furthermore, such vibration motor, and hence the control unit, can be manufactured in a compact and lightweight form.

Particularly, the invention may provide a control unit which enables control of 3-dimensional motions of a character, such as rotation or spinning of the character while moving the character in a desired direction on the display, or changing the character's pose, thereby permitting the player to feel virtual reality in the performance. The virtual reality is further enhanced by the vibrations transmitted to the player.

Having shown and described a preferred embodiments of the present invention by way of example, it should be realized that structural changes could be made and other example given without departing from either the spirit or scope of this invention. It should therefore be understood that the invention is not limited to the embodiments explicity described herein.

What is claimed is:

1. A control unit connected to a machine for retrieving and processing information stored on a recording medium, said control unit operable by an operator to send instructions to said machine to execute a program stored on said recording medium, said control unit comprising:
  a housing;
  a first finger-manipulatable controller including:
    a first set of push buttons protruding from one end of the upper surface of said housing;
    a circuit board having a plurality of fixed electric contacts;
    a resilient member placed on said circuit board and having a plurality of movable contacts each associated with a corresponding one of said fixed contacts;
    a supportive member positioned at the center of said resilient member, said supportive member having at the top end thereof a convex fulcrum surface; and
    a pivotal controller member having a central concave surface in contact with said convex fulcrum surface of said supportive member;
    wherein, each of said push buttons of said first controller is formed on said pivotal controller member in association with a corresponding one of said movable contacts such that when said push button is pushed downward said pivotal controller member is pivoted about said fulcrum, thereby pressing a corresponding movable contact downward;
  a second finger-manipulatable controller having a second set of push buttons protruding from the other end of the upper surface of said housing;
  a pair of diverging grips which are molded integral with said housing and project from one side (rear side) of said housing facing said operator towards the player, said grips supportable by both palms of the operator, and
  a vibration motor mounted within at least one of said grips via an adapter, said motor including:
    a casing;
    a freely rotatable shaft supported by said casing;
    an eccentric member mounted on said shaft, said eccentric member having a rotor mounted on said shaft and a plurality of coils mounted on said rotor;
    a magnet mounted on said casing and facing said eccentric member; and
    means for supplying electric current to each of said coils for energizing said motor and setting said motor in vibration by the eccentric rotation of said eccentric member;
  wherein said housing, grips and controllers are sized and arranged so that said operator is able to manipulate said controllers with his fingers and feel the vibration of said energized motor through at least one of said grips.

2. A control unit connected to a machine for retrieving and processing information stored on a recording medium, said control unit operable by an operator to send instructions to said machine to execute a program stored on said recording medium, said control unit comprising:
  a housing;
  a first finger-manipulatable controller including:
    a first set of push buttons protruding from one end of the upper surface of said housing;
    a circuit board having a plurality of fixed electric contacts;
    a resilient member placed on said circuit board and having a plurality of movable contacts each associated with a corresponding one of said fixed contacts;
    a supportive member positioned at the center of said resilient member, said supportive member having at the top end thereof a convex fulcrum surface;
    a pivotal controller member having a central concave surface in contact with said convex fulcrum surface of said supportive member; and
    a spacer formed integral with said supportive member to facilitate positioning of said pivotal supportive controller member with respect to said resilient member, said spacer having arms that stretch not to interfere with said movable contacts;
    wherein each of said push buttons of said first controller is formed on said pivotal controller member in association with a corresponding one of said movable contacts such that when said push button is pushed downward said pivotal controller member is pivoted about said fulcrum, thereby pressing a corresponding movable contact downward;
  a second finger-manipulatable controller having a second set of push buttons protruding from the other end of the upper surface of said housing;
  a pair of diverging grips which are molded integral with said housing and project from one side (rear side) of said housing facing said operator towards the player, said grips supportable by both palms of the operator, and
  a vibration motor mounted within at least one of said grips via an adapter, said motor including:
    a casing;
    a freely rotatable shaft supported by said casing;
    an eccentric member mounted on said shaft, said eccentric member having a rotor mounted on said shaft and a plurality of coils mounted on said rotor;
    a magnet mounted on said casing and facing said eccentric member; and
    means for supplying electric current to each of said coils for energizing said motor and setting said motor in vibration by the eccentric rotation of said eccentric member;
  wherein said housing, grips and controllers are sized and arranged so that said operator is able to manipulate said controllers with his fingers and feel the vibration of said energized motor through at least one of said grips.

3. The control unit as claimed in any one of claims 1 and 2 wherein said motor adapter is molded integral with said grips, and wherein said vibration motor is mounted on said motor adapter via an elastic member.

4. The control unit as claimed in any one of claims 1 and 2 further comprising third and fourth controllers disposed at the respective opposing base sections of said grips, each of said third and fourth controllers having a rotary controller.

5. The control unit as claimed in claim 4 further comprising fifth and sixth controllers disposed on the front side which is the side remote from said operator of said housing, each of said controllers having a set of protruding push buttons.

6. The control unit as claimed in claims 5 wherein each of said fifth and sixth controllers has at least two vertically arranged push buttons.

7. The control unit as claimed in any one of claims 1 and 2 further comprising a third controller in the form of a rotary controller between the pair of said grips.

8. The control unit as claimed in any one of claims 1 and 2 wherein said machine is a game machine.

9. A control unit connected to a machine for retrieving and processing information stored on a recording medium, said control unit operable by an operator to send instructions to said machine to execute a program stored on said recording medium, said control unit comprising:

a housing;

a finger-manipulatable first controller mounted on said housing, said first controller including:

a first set of push buttons protruding from one end of the upper surface of said housing;

a circuit board having a plurality of fixed electric contacts;

a resilient member placed on said circuit board and having a plurality of movable contacts each associated with a corresponding one of said fixed contacts;

a supportive member positioned at the center of said resilient member, said supportive member having at the top end thereof a convex fulcrum surface; and a pivotal controller member having a central concave surface in contact with said convex fulcrum surface of said supportive member;

wherein each of said push buttons of said first controller is formed on said pivotal controller member in association with a corresponding one of said movable contacts such that when said push button is pushed downward said pivotal controller member is pivoted about said fulcrum, thereby pressing a corresponding movable contact downward;

a finger-manipulatable second controller having a second set of push buttons protruding from the other end of the upper surface of said housing;

a pair of grips which are molded integral with said housing and are supportable by both palms of the operator; and a vibration motor mounted within at least one of said grips via an adapter, said motot including:

a casing;

a freely rotatable shaft supported by said casing;

an eccentric member mounted on said shaft, said eccentric member having a rotor mounted on said shaft and a plurality of coils mounted on said rotor;

a magnet mounted on said casing and facing said eccentric member; and means for supplying electric current to each of said coils for energizing said motor and setting said motor in vibration by the eccentric rotation of said eccentric member;

wherein said vibration motor is set in a vibratory motion caused by the rotation of said eccentric member when said motor is energized by said electric current, and transmits the vibrations to said operator via said grips.

10. A control unit connected to a machine for retrieving and processing information stored on a recording medium, said control unit operable by an operator to send instructions to said machine to execute a program stored on said recording medium, said control unit comprising:

a housing;

a finger-manipulatable first controller mounted on said housing, said first controller including:

a first set of push buttons protruding from one end of the upper surface of said housing;

a circuit board having a plurality of fixed electric contacts;

a resilient member placed on said circuit board and having a plurality of movable contacts each associated with a corresponding one of said fixed contacts;

a supportive member positioned at the center of said resilient member, said supportive member having at the top end thereof a convex fulcrum surface;

a pivotal controller member having a central concave surface in contact with said convex fulcrum surface of said supportive member; and a spacer formed integral with said supportive member to facilitate positioning of said pivotal supportive controller member with respect to said resilient member, said spacer having arms that stretch not to interfere with said movable contacts;

wherein each of said push buttons of said first controller is formed on said pivotal controller member in association with a corresponding one of said movable contacts such that when said push button is pushed downward said pivotal controller member is pivoted about said fulcrum, thereby pressing a corresponding movable contact downward;

a finger-manipulatable second controller having a second set of push buttons protruding from the other end of the upper surface of said housing;

a pair of grips which are molded in egral with said housing and are supportable by both palms of the operator; and a vibration motor mounted within at least one of said grips via an adapter, said motor including:

a casing;

a freely rotatable shaft supported by said casing;

an eccentric member mounted on said shaft, said eccentric member having a rotor mounted on said shaft and a plurality of coils mounted on said rotor;

a magnet mounted on said casing and facing said eccentric member; and means for supplying electric current to each of said coils for energizing said motor and setting said motor in vibration by the eccentric rotation of said eccentric member;

wherein said vibration motor is set in a vibratory motion caused by the rotation of said eccentric member when said motor is energized by said electric current, and transmits the vibrations to said operator via said grips.

11. The control unit as claimed in any one of claims 9 and 10 wherein said motor adapter is molded integral with said grips, and wherein said vibration motor is mounted on said motor adapter via an elastic member.

12. The control unit as claimed in any one of claims 9 and 10 further comprising a third controller in the form of a rotary controller between the pair of said grips.

13. The control unit as claimed in claim 12 further comprising fifth and sixth controllers disposed on the opposite ends of the front side which is the side remote from the operator of said housing, each of said controllers having a set of protruding push buttons.

14. The control unit as claimed in claim 13 wherein each of said fifth and sixth controllers has at least two vertically arranged push buttons.

15. The control unit as claimed in any one of claims 9 and 10 wherein said machine is a game machine.

* * * * *